(12) United States Patent
Chen et al.

(10) Patent No.: US 11,532,307 B2
(45) Date of Patent: *Dec. 20, 2022

(54) IMAGE PROCESSING APPARATUS AND METHOD

(71) Applicant: SHANGHAI CAMBRICON INFORMATION TECHNOLOGY CO., LTD, Shanghai (CN)

(72) Inventors: Tianshi Chen, Shanghai (CN); Shuai Hu, Shanghai (CN); Xiaobing Chen, Shanghai (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 188 days.

This patent is subject to a terminal disclaimer.

(21) Appl. No.: 16/615,255

(22) PCT Filed: Sep. 29, 2018

(86) PCT No.: PCT/CN2018/108696
§ 371 (c)(1),
(2) Date: Nov. 20, 2019

(87) PCT Pub. No.: WO2019/062931
PCT Pub. Date: Apr. 4, 2019

(65) Prior Publication Data
US 2020/0168227 A1    May 28, 2020

(30) Foreign Application Priority Data

Sep. 29, 2017   (CN) .......................... 201710913131.2
Sep. 29, 2017   (CN) .......................... 201710913272.4
Nov. 14, 2017   (CN) .......................... 201711121244.5

(51) Int. Cl.
*G10L 15/26*   (2006.01)
*G10L 15/06*   (2013.01)
(Continued)

(52) U.S. Cl.
CPC ............ *G10L 15/26* (2013.01); *G10L 15/063* (2013.01); *G10L 15/1815* (2013.01); *G10L 15/22* (2013.01); *G10L 2015/223* (2013.01)

(58) Field of Classification Search
CPC ... G10L 15/22; G10L 15/063; G10L 15/1815; G10L 15/32; G10L 2015/223;
(Continued)

(56) References Cited

U.S. PATENT DOCUMENTS 6,570,588 B1 *   5/2003   Ando ................... G06F 3/0481
                                                             715/728
10,187,568 B1 *  1/2019   Tran .................... H04M 1/0264
(Continued)

FOREIGN PATENT DOCUMENTS

CN    105979035 A    9/2016
CN    106156310 A    11/2016
(Continued)

OTHER PUBLICATIONS

Sumina Yamashita, et al., "A Method to create illustrate images using DCGAN," JISJ SIG Technical Report, vol. 2017-MPS-112 No. 16, Feb. 27, 2017; translation of abstract included.
(Continued)

*Primary Examiner* — Michael Colucci
(74) *Attorney, Agent, or Firm* — Rimon PC

(57) ABSTRACT

The present disclosure discloses an image processing device including: a receiving module configured to receive a voice signal and an image to be processed; a conversion module configured to convert the voice signal into an image processing instruction and determine a target area according to
(Continued)

a target voice instruction conversion model, in which the target area is a processing area of the image to be processed; and a processing module configured to process the target area according to the image processing instruction and a target image processing model. The examples may realize the functionality of using voice commands to control image processing, which may save users' time spent in learning image processing software prior to image processing, and improve user experience.

16 Claims, 7 Drawing Sheets

(51) Int. Cl.
  *G10L 15/18* (2013.01)
  *G10L 15/22* (2006.01)
(58) Field of Classification Search
  CPC ..... G10L 15/183; G06K 9/6257; G06F 3/167; G06N 3/08; G06T 7/11; B25J 9/1697
  See application file for complete search history.

(56) References Cited

U.S. PATENT DOCUMENTS

| | | | |
|---|---|---|---|
| 10,427,306 B1* | 10/2019 | Quinlan | B25J 9/1697 |
| 2011/0060587 A1* | 3/2011 | Phillips | G10L 15/30 704/235 |
| 2014/0081625 A1 | 3/2014 | Wilensky et al. | |
| 2014/0249814 A1* | 9/2014 | Nakano | G06V 10/464 704/235 |
| 2016/0239259 A1* | 8/2016 | Lenchner | G10L 15/1822 |
| 2017/0142327 A1 | 5/2017 | Bayani | |
| 2019/0057696 A1* | 2/2019 | Ogawa | G10L 15/1815 |
| 2019/0228762 A1* | 7/2019 | Wang | G06V 10/98 |

FOREIGN PATENT DOCUMENTS

| | | |
|---|---|---|
| CN | 106814639 A | 6/2017 |
| CN | 107025629 A | 8/2017 |
| EP | 0 789 296 A1 | 8/1997 |
| EP | 0789296 A1 | 8/1997 |
| JP | H03075860 A | 8/1989 |
| JP | H09265379 A | 10/1997 |
| JP | 2009134433 A | 8/2012 |

OTHER PUBLICATIONS

Extended European Search Report for Application No. 19215861.6 dated May 15, 2020.
Extended European Search Report for Application No. 19215862.4 dated May 15, 2020.
Chen, T., et al., "DianNao: A Small-Footprint High-Throughput Accelerator for Ubiquitous Machine-Learning," ASPLOS '14 Proceedings of the 19th international conference on Architectural support for programming languages and operating systems, pp. 269-284, Salt Lake City, Utah, USA—Mar. 1, 2014; available: https://dl.acm.org/citation.cfm?id=2541967.
Chen, T., et al., "A Small-Footprint Accelerator for Large-Scale Neural Networks," ACM Transactions on Computer Systems (TOCS), vol. 33, Issue 2, May 1, 2015, Article No. 6, ACM New York, NY, USA; available: https://dl.acm.org/citation.cfm?id=2701417.
Chen, Y., et al., "DaDianNao: A Machine-Learning Supercomputer," MICRO-47 Proceedings of the 47th Annual IEEE/ACM International Symposium on Microarchitecture, pp. 609-622, Cambridge, United Kingdom—Dec. 13, 2014; available: https://dl.acm.org/citation.cfm?id=2742217.
Luo, T., et al., "DaDianNao: A Neural Network Supercomputer," Published in: IEEE Transactions on Computers, vol. 66 , Issue: 1, pp. 73-88, Date of Publication: May 30, 2016; available: https://ieeexplore.ieee.org/document/7480791.
Liu, D., et al., "PuDianNao: A Polyvalent Machine Learning Accelerator," ASPLOS '15 Proceedings of the Twentieth International Conference on Architectural Support for Programming Languages and Operating Systems.pp. 369-381, Istanbul, Turkey—Mar. 14, 2015; available: https://dl.acm.org/citation.cfm?id=2694358.
Du, Z., et al., "ShiDianNao: Shifting Vision Processing Closer to the Sensor," ISCA '15 Proceedings of the 42nd Annual International Symposium on Computer Architecture, pp. 92-104, Portland, Oregon—Jun. 13, 2015 available: https://dl.acm.org/citation.cfm?id=2750389.
Du, Z., et al., "An Accelerator for High Efficient Vision Processing," Published in: IEEE Transactions on Computer-Aided Design of Integrated Circuits and Systems, vol. 36 , Issue: 2, Jun. 22, 2016, pp. 227-240; available: https://ieeexplore.ieee.org/document/7497562.
Liu, S., et al., "Cambricon: An Instruction Set Architecture for Neural Networks," 2016 ACM/IEEE 43rd Annual International Symposium on Computer Architecture (ISCA), Seoul, South Korea, Jun. 18, 2016; available: https://ieeexplore.ieee.org/document/7551409.
Zhang, S. et al., "Cambricon-X: An Accelerator for Sparse Neural Networks," Published in: 2016 49th Annual IEEE/ACM International Symposium on Microarchitecture (MICRO), Taipei, Taiwan, Oct. 15, 2016; available: https://ieeexplore.ieee.org/document/7783723.
Chen, Y., et al., "DianNao Family: Energy-Efficient Hardware Accelerators for Machine Learning," Communications of the ACM, vol. 59 Issue 11, Oct. 28, 2016, pp. 105-112, ACM New York, NY, USA; available: https://dl.acm.org/citation.cfm?id=2996864.
European Communication dated Jun. 2, 2022, corresponding to counterpart European Application No. 18 861 574.4; 20 pages.

\* cited by examiner

IMAGE PROCESSING APPARATUS AND METHOD

RELATED APPLICATIONS

This application is a national stage application of PCT/CN2018/108696, filed Sep. 29, 2018, which claims the benefit of priority from Chinese Application No. 201711121244.5, filed Nov. 14, 2017, and Chinese Application No. 201710913272.4, filed Sep. 29, 2017, and Chinese Application No. 201710913131.2, filed Sep. 29, 2017, the disclosures of which are incorporated herein by reference in their entirety.

TECHNICAL FIELD

The disclosure relates to the field of image processing, and specifically relates to an image processing device and method.

BACKGROUND

After taking photos, users tend to process the images by using Photoshop in the computer or photo retouch software in the mobile phone to display better image effect.

However, prior to using Photoshop in the computer or photo retouch software in the mobile phone to process images, users need to learn how to use the software and then input instructions manually to control a computer or a mobile phone to perform retouch operations. The method is time-consuming for users and brings poor user experience.

SUMMARY

The examples provide an image processing device and method, which may realize a functionality of inputting voice to process images, save users' time spent in learning image processing software prior to image processing, and improve user experience.

In a first aspect, examples provide an image processing device including:

a receiving module configured to receive a voice signal and an image to be processed;

a conversion module configured to convert the voice signal into an image processing instruction and a target area according to a target voice instruction conversion model, and the target area is a processing area of the image to be processed; and a processing module configured to process the target area according to the image processing instruction and a target image processing model.

In an example, the conversion module may be specifically configured to:

convert the voice signal into text information through a voice recognition technology;

convert the text information into the image processing instruction through a natural language processing technology and the target voice instruction conversion model; and divide the image to be processed into areas according to granularity of semantic areas in the image processing instruction and an image recognition technology, and obtain the target area.

In an example, the conversion module may be further specifically configured to:

convert the voice signal into the image processing instruction through the voice recognition technology, a semantic understanding technology, and the target voice instruction conversion model; and divide the image to be processed into areas according to the granularity of semantic areas in the image processing instruction and the image recognition technology, and obtain the target area.

In an example, the image processing device may further include:

a storage module configured to store the text information, the image processing instruction, or the target area.

In an example, the processing module may be specifically configured to:

obtain M image processing instructions from the storage module in a preset time window, in which the M is an integer greater than 1; and process the target area according to the M image processing instructions and the target image processing model.

In an example, the processing module may be further specifically configured to:

delete image processing instructions with identical functionalities in the M image processing instructions to obtain N image processing instructions, in which the N is an integer smaller than the M; and process the target area according to the N image processing instructions and the target image processing model.

In an example, the conversion module may be configured to:

implement adaptive training on a voice instruction conversion model to obtain the target voice instruction conversion model.

In an example, the conversion module may implement adaptive training on the voice instruction conversion model either offline or online.

In an example, adaptive training implemented by the conversion module on the voice instruction conversion module is supervised or unsupervised.

In an example, the conversion module may be further configured to:

convert the voice signal into a prediction instruction according to the voice instruction conversion model;

determine correlation coefficients between the prediction instruction and a corresponding instruction set; and optimize the voice instruction conversion model according to the correlation coefficients between the prediction instruction and the corresponding instruction set to obtain the target voice instruction conversion model.

In an example, the image processing device may further include:

a training module configured to convert the voice signal into the prediction instruction according to the voice instruction conversion model, determine correlation coefficients between the prediction instruction and the corresponding instruction set, and optimize the voice instruction conversion model according to the correlation coefficients between the prediction instruction and the corresponding instruction set to obtain the target voice instruction conversion model.

In an example, the processing module may be configured to:

implement adaptive training on the image processing model to obtain the target image processing model.

In an example, the processing module may implement adaptive training on the image processing model either offline or online.

In an example, adaptive training implemented by the processing module on the image processing module is supervised or unsupervised.

In an example, the processing module may be further configured to:

process the image to be processed according to the image processing model to obtain a predicted image;

determine correlation coefficients between the predicted image and the corresponding target image; and optimize the image processing model according to the correlation coefficients between the predicted image and the corresponding target image to obtain the target image processing model.

In an example, the training module may be further configured to:

process the image to be processed according to the image processing model to obtain the predicted image;

determine correlation coefficients between the predicted image and the corresponding target image; and optimize the image processing model according to the correlation coefficients between the predicted image and the corresponding target image to obtain the target image processing model.

In a second aspect, examples provide an image processing method including:

receiving the voice signal and the image to be processed;

converting the voice signal into the image processing instruction and the target area according to the target voice instruction conversion model, in which the target area is the processing area of the image to be processed; and processing the target area according to the image processing instruction and the target image processing model.

In an example, the method of converting the voice signal into the image processing instruction and the target area according to the target voice instruction conversion model may include:

converting the voice signal into the text information through the voice recognition technology;

converting the text information into the image processing instruction through the natural language processing technology and the target voice instruction conversion model; and dividing the image to be processed into areas according to granularity of semantic areas in the image processing instruction and image recognition technology, and obtaining the target area.

In an example, the method of converting the voice signal into the image processing instruction and the target area according to the target voice instruction conversion model may include:

converting the voice signal into the image processing instruction through the voice recognition technology, the semantic understanding technology, and the target voice instruction conversion model; and dividing the image to be processed into areas according to the granularity of semantic areas in the image processing instruction and the image recognition technology, and obtaining the target area.

In an example, the method of dividing the image to be processed into areas according to the granularity of semantic areas in the image processing instruction and the image recognition technology, and obtaining the area to be processed of the image to be processed may include:

dividing the image to be processed into M areas according to the granularity of the semantic areas in the image processing instruction, in which the M areas have the same granularity; and obtaining the target area from the M areas according to the image processing instruction.

In an example, the method may further include storing the text information, the image processing instruction, or the target area.

In an example, the processing the target area according to the image processing instruction may include:

obtaining M image processing instructions from the storage module in a preset time window, in which the M is an integer greater than 1; and processing the target area according to the M image processing instructions and the target image processing model.

In an example, the method of processing the target area according to the M image processing instructions and the target image processing model may include:

deleting image processing instructions with identical functionalities in the M image processing instructions to obtain N image processing instructions, in which the N is an integer smaller than the M; and processing the target area according to the N image processing instructions and the target image processing model.

In an example, prior to the receiving the voice signal and the image to be processed, the method may further include:

implementing adaptive training on the voice instruction conversion model to obtain the target voice instruction conversion model.

In an example, the adaptive training on the voice instruction conversion model is implemented either offline or offline.

In an example, the adaptive training implemented on the voice instruction conversion module is supervised or unsupervised.

In an example, the implementing adaptive training on the voice instruction conversion model to obtain the target voice instruction conversion model may include:

converting the voice signal into the prediction instruction according to the voice instruction conversion model;

determining the correlation coefficients between the prediction instruction and the corresponding instruction set; and optimizing the voice instruction conversion model according to the correlation coefficients between the prediction instruction and the corresponding instruction set to obtain the target voice instruction conversion model.

In an example, prior to the receiving the voice signal and the image to be processed, the method may further include:

implementing adaptive training on the image processing model to obtain the target image processing model.

In an example, the adaptive training on the image processing model is implemented either offline or offline.

In an example, the adaptive training implemented on the image processing model is supervised or unsupervised.

In an example, the implementing adaptive training on the image processing model to obtain the target image processing model may include:

processing the image to be processed according to the image processing model to obtain the predicted image;

determining the correlation coefficients between the predicted image and the corresponding target image; and optimizing the image processing model according to the correlation coefficients between the predicted image and the corresponding target image to obtain the target image processing model.

It may be seen that in the examples, the receiving module of the image processing device obtains the voice signal and the image to be processed; the conversion module of the image processing device converts the voice signal into the image processing instruction and the target area according to the target voice instruction conversion model, in which the target area is a processing area of the image to be processed; and the processing mode of the image processing device processes the target area according to the image processing instruction and the target voice instruction conversion model. Compared with the existing image processing technology, the disclosure processes images through voice, which may save users' time spent in learning image processing software prior to image processing and improve user experience.

In a third aspect, examples provide an image processing device including:

a voice collector configured to collect a voice signal input by users;

an instruction converter configured to convert the voice signal into an image processing instruction and a target area according to a target voice instruction conversion model, in which the target area is a processing area of the image to be processed; and an image processor configured to process the target area according to the image processing instruction and a target image processing model.

In an example, the instruction converter may include:

a first voice recognizer configured to convert a voice signal into text information through the voice recognition technology;

a voice-to-text converter configured to convert the text information into the image processing instruction through a natural language processing technology and the target voice instruction conversion model;

a first image recognizer configured to divide the image to be processed into areas according to granularity of semantic areas in the image processing instruction and the image recognition technology, and obtain the target area.

In an example, the instruction converter may include:

a second voice recognizer configured to convert the voice signal into the image processing instruction through the voice recognition technology, the semantic understanding technology, and the target voice instruction conversion model;

a second image recognizer configured to divide the image to be processed into areas according to the granularity of semantic areas in the image processing instruction and the image recognition technology, and obtain the target area.

In an example, the image processing device may further include:

a memory configured to store the text information, the image processing instructions, or the target area.

In an example, the image processor may include:

an instruction fetch module configured to obtain M image processing instructions from the memory in the preset time window, in which the M is an integer greater than 1;

a processing module configured to process the target area according to the M image processing instructions and the target image processing model.

In an example, the processing module may be configured to:

delete the image processing instructions with identical functionalities in the M image processing instructions to obtain N image processing instructions, in which the N is an integer smaller than the M; and process the target area according to the N image processing instructions and the target image processing model.

In an example, the instruction converter may be configured to:

implement adaptive training on the voice instruction conversion model to obtain the target voice instruction conversion model.

In an example, the instruction converter may implement adaptive training on the voice instruction conversion model either offline or online.

In an example, adaptive training implemented by the instruction conversion module on the voice instruction conversion module is supervised or unsupervised.

In an example, the instruction converter may be further configured to:

convert the voice signal into the prediction instruction according to the voice instruction conversion model;

determine correlation coefficients between the prediction instruction and the corresponding instruction set; and optimize the voice instruction conversion model according to the correlation coefficients between the prediction instruction and the corresponding instruction set to obtain the target voice instruction conversion model.

In an example, the image processing device may further include:

a trainer configured to convert the voice signal into the prediction instruction according to the voice instruction conversion model, determine correlation coefficients between the prediction instruction and the corresponding instruction set, and optimize the voice instruction conversion model according to the correlation coefficients between the prediction instruction and the corresponding instruction set to obtain the target voice instruction conversion model.

In an example, the image processor may be configured to:

implement adaptive training on the image processing model to obtain the target image processing model.

In an example, the image processor may implement adaptive training on the image processing model either offline or online.

In an example, adaptive training implemented by the image processor on the image processing module is supervised or unsupervised.

In an example, the image processor may be further configured to:

process the image to be processed according to the image processing model to obtain the predicted image;

determine correlation coefficients between the predicted image and the corresponding target image; and optimize the image processing model according to the correlation coefficients between the predicted image and the corresponding target image to obtain the target image processing model.

In an example, the trainer may be further configured to:

process the image to be processed according to the image processing model to obtain the predicted image;

determine correlation coefficients between the predicted image and the corresponding target image; and optimize the image processing model according to the correlation coefficients between the predicted image and the corresponding target image to obtain the target image processing model.

In a fourth aspect, examples provide an image processing method including:

collecting a voice signal input by users;

converting the voice signal into the image processing instruction and the target area according to the target voice instruction conversion model, in which the target area is the processing area of the image to be processed; and processing the target area according to the image processing instruction and the target image processing model.

In an example, the converting the voice signal into the image processing instruction and the target area according to the target voice instruction conversion model may include:

converting the voice signal into text information through the voice recognition technology;

converting the text information into the image processing instruction through the natural language processing technology and the target voice instruction conversion model; and dividing the image to be processed into areas according to the granularity of semantic areas in the image processing instruction and the image recognition technology, and obtaining the target area.

In an example, the converting the voice signal into the image processing instruction and the target area according to the target voice instruction conversion model may include:

converting the voice signal into the image processing instruction through the voice recognition technology, the semantic understanding technology, and the target voice instruction conversion model; and dividing the image to be processed into areas according to the granularity of semantic areas in the image processing instruction and the image recognition technology, and obtaining the target area.

In an example, the method may further include storing the text information, the image processing instruction, or the target area.

In an example, the processing the target area according to the image processing instruction may include:

obtaining M image processing instructions from the storage module in the preset time window, in which the M is an integer greater than 1; and processing the target area according to the M image processing instructions and the target image processing model.

In an example, the processing the target area according to the M image processing instructions and the target image processing model may include:

deleting the image processing instructions with identical functionalities in the M image processing instructions to obtain N image processing instructions, in which the N is an integer smaller than the M; and processing the target area according to the N image processing instructions and the target image processing model.

In an example, prior to the receiving the voice signal and the image to be processed, the method may further include:

implementing adaptive training on the voice instruction conversion model to obtain the target voice instruction conversion model.

In an example, the adaptive training on the voice instruction conversion model is implemented either offline or offline.

In an example, the adaptive training on the voice instruction conversion module is supervised or unsupervised.

In an example, the implementing adaptive training on the voice instruction conversion model to obtain the target voice instruction conversion model may include:

converting the voice signal into the prediction instruction according to the voice instruction conversion model;

determining correlation coefficients between the prediction instruction and the corresponding instruction set; and optimizing the voice instruction conversion model according to the correlation coefficients between the prediction instruction and the corresponding instruction set to obtain the target voice instruction conversion model.

In an example, prior to the receiving the voice signal and the image to be processed, the method may further include:

implementing adaptive training on the image processing model to obtain the target image processing model.

In an example, the adaptive training on the image processing model is implemented either offline or offline.

In an example, the adaptive training on the image processing model is supervised or unsupervised.

In an example, the implementing adaptive training on the image processing model to obtain the target image processing model may include:

processing the image to be processed according to the image processing model to obtain the predicted image;

determining correlation coefficients between the predicted image and the corresponding target image; and optimizing the image processing model according to the correlation coefficients between the predicted image and the corresponding target image to obtain the target image processing model.

In a fifth aspect, examples provide an image processing chip, in which the chip includes the image processing device described in the third aspect of the examples.

In an example, the chip may include a main chip and a companion chip.

The companion chip may include the device described in the first aspect of the examples. The main chip may be configured to provide a start signal for the companion chip, control and transmit the image to be processed and the image processing instruction to the companion chip.

In a sixth aspect, examples provide a chip package structure, which may include the image processing chip described in the fifth aspect of the example of the present disclosure.

In a seventh aspect, examples provide a board card, which may include the chip package structure described in the sixth aspect of the example of the present disclosure.

In an eighth aspect, examples provide an electronic device, which may include the board card described in the seventh aspect of the example of the present disclosure.

It may be seen that in the examples, the voice collector collects the voice signal input by users; the instruction converter converts the voice signal into the image processing instruction and the target area according to the target voice instruction conversion model, in which the target area is the processing area of the image to be processed; and the image processor processes the target area according to the image processing instruction and the target image processing model. Compared with existing image processing technology, the disclosure processes images through voice, which may save users' time spent in learning image processing software prior to image processing and improve user experience.

In a ninth aspect, examples provide an image processing device including:

an input/output unit configured to input the voice signal and the image to be processed;

a storage unit configured to store the voice signal and the image to be processed;

an image processing unit configured to convert the voice signal into the image processing instruction and the target area, in which the target area is the processing area of the image to be processed, process the target area according to the image processing instruction to obtain a processed image, and store the image to be processed into the storage unit; and the input/output unit may be further configured to output the processed image.

In an example, the storage unit may include a neuron storage unit and a weight cache unit, and a neural network operation unit of the image processing unit may include a neural network operation subunit.

When the neuron storage unit may be configured to store the voice signal and the image to be processed, and the weight cache unit may be configured to store a target voice instruction conversion model and a target image processing model, the neural network operation subunit may be configured to convert the voice signal into the image processing instruction and the target area according to the target voice instruction conversion model;

the neural network operation subunit may be further configured to process the target area according to the target image processing model and the image processing instruction to obtain the processed image; and the neural network operation subunit may be further configured to store the processed image into the neuron storage unit.

In an example, the storage unit may include a universal data cache unit, and the neural network operation unit of the image processing unit may include a universal operation subunit;

when the universal data cache unit may be configured to cache the voice signal and the image to processed, the universal operation subunit may be configured to convert the voice signal into the image processing instruction and the target area;

the universal operation subunit may be further configured to process the target area according to the image processing instruction to obtain the processed image; and the universal operation subunit may be further configured to store the processed image in the universal data storage unit.

In an example, the neural network operation subunit may be specifically configured to:

convert the voice signal into text information through the voice recognition technology;

convert the text information into the image processing instruction through the natural language processing technology and the target voice instruction conversion model; and divide the image to be processed into areas according to the granularity of semantic areas in the image processing instruction and the image recognition technology, and obtain the target area.

In an example, the universal operation subunit may be specifically configured to:

convert the voice signal into the image processing instruction through the voice recognition technology, the semantic understanding technology, and the target voice instruction conversion model; and divide the image to be processed into areas according to the granularity of semantic areas in the image processing instruction and the image recognition technology, and obtain the target area.

In an example, the universal operation subunit may be specifically configured to:

convert the voice signal into text information through the voice recognition technology;

convert the voice signal into the image processing instruction through the natural language processing technology;

divide the image to be processed into areas according to the granularity of semantic areas in the image processing instruction and the image recognition technology, and obtain the target area.

In an example, the universal operation subunit may be specifically configured to:

convert the voice signal into the image processing instruction through the voice recognition technology and the semantic understanding technology;

divide the image to be processed into areas according to the granularity of semantic areas in the image processing instruction and the image recognition technology, and obtain the target area.

In an example, the neuron storage unit may be configured to store the target area and the image processing instruction.

In an example, the universal data cache unit may be configured to store the target area and the image processing instruction.

In an example, the neural network operation subunit may be configured to:

obtain M image processing instructions from the neuron storage unit in the preset time window;

delete the image processing instructions with identical functionalities in the M image processing instructions to obtain N image processing instructions, in which the M is an integer greater than 1 and the N is an integer smaller than the M; and process the target area according to the N image processing instructions and the target image processing model to obtain the processed image.

In an example, the universal operation subunit may be configured to:

obtain M image processing instructions from the universal data cache unit in the preset time window;

delete the image processing instructions with identical functionalities in the M image processing instructions to obtain N image processing instructions, in which the M is an integer greater than 1 and the N is an integer smaller than the M; and process the target area according to the N image processing instructions and the target image processing model to obtain the processed image.

In an example, the neural network operation subunit may be further configured to implement adaptive training on the voice instruction conversion model to obtain the target voice instruction conversion model.

In an example, the neural network operation subunit may be further configured to:

convert the voice signal into the prediction instruction according to the voice instruction conversion model;

determine correlation coefficients between the prediction instruction and the corresponding instruction set; and optimize the voice instruction conversion model according to the correlation coefficients between the prediction instruction and the corresponding instruction set to obtain the target voice instruction conversion model.

In an example, the neural network operation subunit may be further configured to:

implement adaptive training on an image processing model to obtain the target image processing model.

In an example, the neural network operation subunit may be further configured to:

process the image to be processed according to the image processing model to obtain the predicted image;

determine correlation coefficients between the predicted image and the corresponding target image;

optimize the image processing model according to the correlation coefficients between the predicted image and the corresponding target image to obtain the target image processing model.

In an example, the image processing unit of the image processing device may further include:

an instruction cache unit configured to store an instruction to be performed, in which the instruction includes a neural network operation instruction and a universal operation instruction; and an instruction processing unit configured to transmit the neural network operation instruction to the neural network operation subunit, and transmit the universal operation instruction to the universal operation subunit.

In a tenth aspect, examples provide an image processing method including:

inputting the voice signal and the image to be processed;

storing the voice signal and the image to be processed;

converting the voice signal into the image processing instruction and the target area, in which the target area is the processing area of the image to be processed;

processing the target area according to the image processing instruction to obtain a processed image and storing the image to be processed in the storage unit; and outputting the processed image.

In an example, the converting the voice signal into the image processing instruction and the target area may include:

converting the voice signal into text information through the voice recognition technology;

converting the text information into the image processing instruction through the natural language processing technology and the target voice instruction conversion model; and dividing the image to be processed into areas according to the granularity of semantic areas in the image processing instruction and the image recognition technology, and obtaining the target area.

In an example, the converting the voice signal into the image processing instruction and the target area may include:

converting the voice signal into the image processing instruction through voice recognition technology, semantic understanding technology and a target voice instruction conversion model; and dividing the image to be processed into areas according to the granularity of semantic areas in the image processing instruction and the image recognition technology, and obtaining the target area.

In an example, the converting the voice signal into the image instruction and the target area may include:

converting the voice signal into text information through the voice recognition technology;

converting the text information into the image processing instruction through the natural language processing technology; and dividing the image to be processed into areas according to the granularity of semantic areas in the image processing instruction and the image recognition technology, and obtaining the target area.

In an example, the converting the voice signal into the image instruction and the target area may include:

converting the voice signal into the image processing instruction through the voice recognition technology and the semantic understanding technology;

dividing the image to be processed into areas according to the granularity of semantic areas in the image processing instruction and the image recognition technology, and obtaining the target area.

In an example, after converting the voice signal into the image processing instruction and the target area, the method may further include storing the image processing instruction and the target area.

In an example, the processing the target area according to the image processing instruction to obtain the processed image may include:

obtaining M image processing instructions from the neuron storage unit in the preset time window;

deleting the image processing instructions with identical functionalities in the M image processing instructions to obtain N image processing instructions, in which the M is an integer greater than 1 and the N is an integer smaller than the M; and processing the target area according to the N image processing instructions and the target image processing model to obtain the processed image.

In an example, the processing the target area according to the image processing instruction to obtain the processed image may include:

obtaining M image processing instructions from the universal data cache unit in the preset time window;

deleting the image processing instructions with identical functionalities in the M image processing instructions to obtain N image processing instructions, in which the M is an integer greater than 1 and the N is an integer smaller than the M; and processing the target area according to the N image processing instructions and the target image processing model to obtain the processed image.

In an example, the method may further include:

implementing adaptive training on the voice instruction conversion model to obtain the target voice instruction conversion model.

In an example, the implementing adaptive training on the voice instruction conversion model to obtain the target voice instruction conversion model may include:

converting the voice signal into the prediction instruction according to the voice instruction conversion model;

determining correlation coefficients between the prediction instruction and the corresponding instruction set; and optimizing the voice instruction conversion model according to the correlation coefficients between the prediction instruction and the corresponding instruction set to obtain the target voice instruction conversion model.

In an example, the method may further include:

implementing adaptive training on the image processing model to obtain the predicted image;

determining correlation coefficients between the predicted image and the corresponding target image;

optimizing the image processing model according to the correlation coefficients between the predicted image and the corresponding target image to obtain the target image processing model.

In a eleventh aspect, examples provide an image processing chip, in which the chip includes the image processing device described in the first aspect of the examples.

In an example, the chip may include the main chip and the companion chip;

The companion chip may include the device described in the first aspect of the examples. The main chip may be configured to provide a start signal for the companion chip, control and transmit an image to be processed and an image processing instruction to the companion chip.

In a twelfth aspect, examples provide a chip package structure including the image processing chip described in the eleventh aspect of the example of the present disclosure.

In a thirteenth aspect, examples provide a board card including the chip package structure described in the twelfth aspect of the example of the present disclosure.

In a fourteenth aspect, examples provide an electronic device including a board card described in the thirteenth aspect of the example of the present disclosure.

It may be seen that in the examples, the input/output unit inputs the voice signal and the image to be processed; the storage unit stores the voice signal and the image to be processed; the image processing unit converts the voice signal into the image processing instruction and the target area, in which the target area is the processing area of the image to be processed, processes the target area according to the image processing instruction to obtain the processed image and then stores the image to be processed into the storage unit; and the input/output unit outputs the processed image. Compared with existing image processing technology, the disclosure processes images through voice, which may save users' time spent in learning image processing software prior to image processing and improve user experience.

BRIEF DESCRIPTION OF THE DRAWINGS

To describe technical solutions in examples more clearly, accompanied drawings needed in the examples will be briefly described hereinafter. Apparently, the described accompanied drawings below are some examples. Those of ordinary skill in the art may obtain other accompanied drawings based on the accompanied drawings without creative efforts.

DETAILED DESCRIPTION OF THE EXAMPLES

Technical solutions in the examples will be described in detail hereinafter

The terms such as "first", "second", "third", "fourth" and the like configured in the specification, the claims, and the accompanied drawings of the present disclosure are configured for distinguishing between different objects rather than describing a particular order. The terms "include" and "comprise" as well as variations thereof are intended to cover non-exclusive inclusion. For example, a process, method, system, product, device, or device including a series of steps or units is not limited to the listed steps or units, and may include other steps or units that are not listed; in an example, other steps or units inherent to the process, method, product, or device may be included either.

The term "example" or "implementation" referred to herein means that a particular feature, structure, or characteristic described in conjunction with the example may be contained in at least one example of the present disclosure. The phrase appearing in various places in the specification does not necessarily refer to the same example, nor does it refer to an independent or alternative example that is mutually exclusive with other examples. It is expressly and implicitly understood by those skilled in the art that one example described herein may be combined with other examples.

Figure 1:
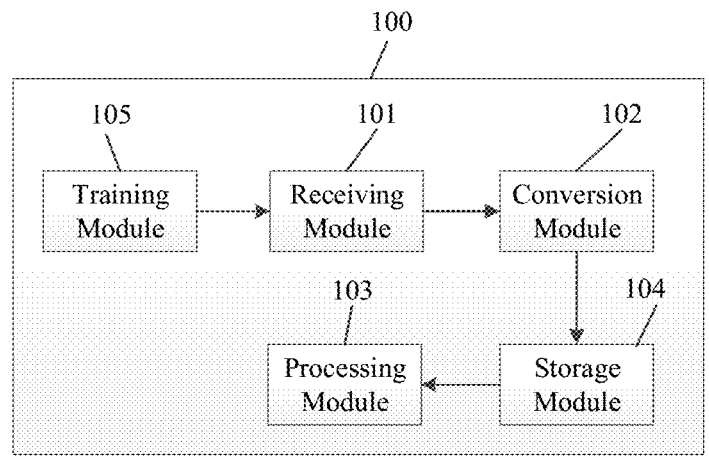
FIG. 1 is a structural diagram of an image processing device according to one example of the present disclosure.
Figure 2:
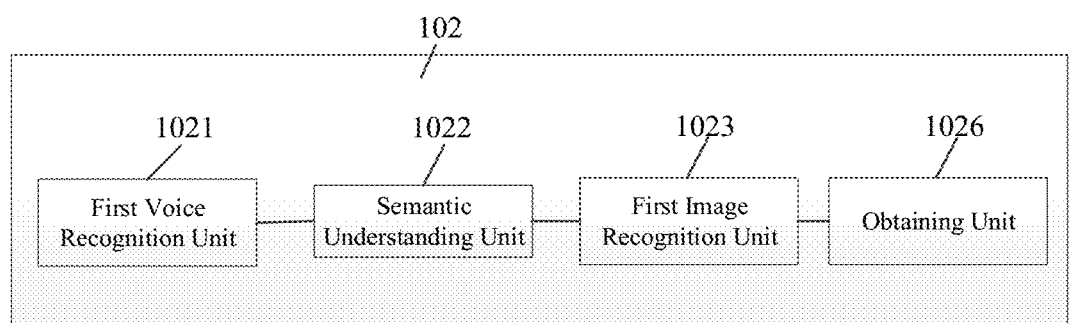
FIG. 2 is a partial structural diagram of another image processing device according to one example of the present disclosure.
Figure 3:
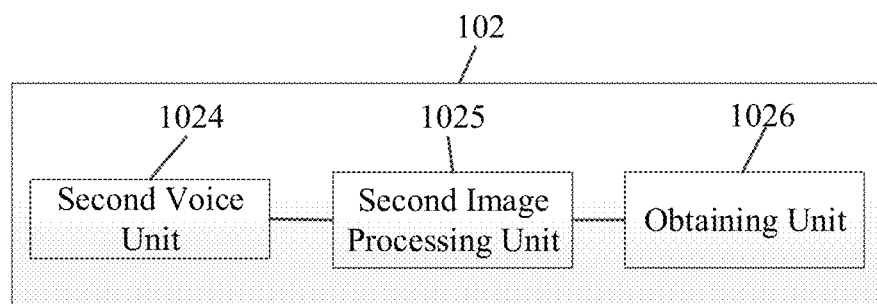
FIG. 3 is a partial structural diagram of another image processing device according to one example of the present disclosure.
Figure 4:
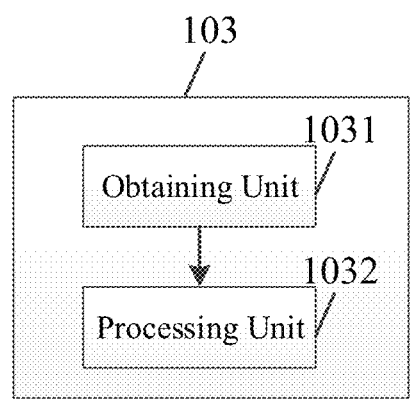
FIG. 4 is a partial structural diagram of another image processing device according to one example of the present disclosure.

In a first aspect, examples provide the structural diagram of the image processing device. As shown in FIG. 1, the image processing device 100 may include:

a receiving module 101 configured to receive the voice signal and the image to be processed.

In an example, the image processing device 100 may further include a preprocessing module. After the receiving module 101 receives the voice signal, the preprocessing module performs noise reduction processing on the voice signal.

In an example, the receiving module 101 may include an audio collection unit, and the audio collection unit may be a voice sensor, a microphone, a pickup, or other audio collection devices.

Specifically, the receiving device 101 also receives an environmental sound signal when receiving the voice signal. The preprocessing module performs noise reduction processing on the voice signal according to the environmental sound signal. For the voice signal, the environmental sound signal is noise.

Furthermore, the audio collection unit may include a microphone array configured to collect the voice signal and the environmental voice signal and reduce noise.

In an example, the image processing device may further include a first storage module and a second storage module. After the receiving device receives the voice signal and the image to be processed, the image processing device stores the voice signal and the image to be processed in the first storage module and the second storage module respectively.

In an example, the first storage module and the second storage module may be identical or different storage modules.

A conversion module 102 may be configured to convert the voice signal into an image processing instruction and a target area according to a target voice instruction conversion model, in which the target area is a processing area of the image to be processed.

In an example, the conversion module 102 obtains the voice processing signal from the first storage module prior to converting the voice signal into the image processing instruction and the target area according to a voice recognition technology, a natural language processing technology, and an image recognition technology.

The conversion module 102 may include:

a first voice recognition unit 1021 configured to convert the voice signal into text information through the voice recognition technology;

a semantic understanding unit 1022 configured to convert the text information into the image processing instruction through the natural language processing technology and the target voice instruction conversion model;

a first image recognition unit 1023 configured to divide the image to be processed into areas according to the granularity of semantic areas in the image processing instruction and the image recognition technology, and obtain the target area.

Furthermore, the conversion module 102 may include an obtaining unit 1026 configured to obtain the granularity of semantic areas in the image processing instruction.

Examples are given to illustrate the semantic areas hereinafter. If the image processing device 100 determines a face area as the target area according to the voice signal, the semantic area refers to the face area in the image to be processed. The image processing device determines a face as the granularity to obtain a plurality of face areas in the image to be processed; when a background is determined as the target area, the image processing device divides the image to be processed into a background area and a non-background area; when a red-color area is determined as the target area, the image processing device divides the image to be processed into areas in different colors.

Specifically, the voice recognition technology used in the present disclosure may include but not limited to an artificial neural network (ANN), a Hidden Markov Model (HMM), and other models. The first voice recognition unit is capable of processing the voice signal according to the voice recognition technology; the natural language processing technology may include but not limited to a statistical machine learning, ANN, and other methods, and the semantic understanding unit is capable of extracting semantic information according to the natural language processing technology; the image recognition technology may include but not limited to an edge-detection-based algorithm, a threshold segmentation algorithm, a region growing and watershed algorithm, a grayscale integral projection curve analysis algorithm, a template matching algorithm, a deformable template algorithm, a Hough transform algorithm, a Snake operator algorithm, an elastic image matching technology based on Gabor wavelet transform, an active shape model, an active appearance model, and the like. The image recognition unit is capable of segmenting the image to be processed into different areas according to the image recognition technology.

In an example, the voice recognition unit 1021 converts the voice signal into the text information through the voice recognition technology, and stores the text information into the first storage module. The semantic understanding unit 1022 obtains the text information from the first storage module, converts the text information into the image processing instruction through the natural language processing technology and the target voice instruction conversion model, and stores the image processing instruction in the first storage module; the first image recognition unit 1023 divides the image to be processed into areas according to the granularity of semantic areas in the image processing instruction and the image recognition technology, obtains the target area, and then stores the dividing results and the target areas into the second storage module.

In an example, the conversion module 102 may further include:

a voice recognition unit 1025 configured to directly convert the voice signal into the image processing instruction according to the voice recognition technology, the natural language processing technology, and the target voice instruction conversion model, and store the image processing instruction into the first storage module; and a second image recognition unit 1026 configured to divide the image to be processed according to the granularity of the semantic areas in which the image processing instruction performs operation on the image to be processed, obtain the target area in which the target area refers to the area processing the image to be processed, and store the dividing results and the target area into the second storage module.

In an example, before the receiving module 101 receives the voice signal and the image to be processed, the conversion module 102 may implement adaptive training on the voice instruction conversion model to obtain the target voice instruction conversion model.

The adaptive training on the voice instruction conversion model is implemented offline or online.

Specifically, the adaptive training on the voice instruction conversion model being implemented offline refers to that the conversion module 102 may implement adaptive training on the voice instruction conversion model on the basis of hardware of the conversion module 102 to obtain a target voice instruction conversion model; the adaptive training on the voice instruction conversion model being implemented online refers to that a cloud server different from the conversion model may implement adaptive training on the voice instruction conversion model to obtain the target voice instruction conversion model. When the conversion module 102 needs to use the target voice instruction conversion model, the conversion module 102 obtains the target voice instruction conversion model from the cloud server.

In an example, the adaptive training implemented on a voice instruction conversion model is supervised or unsupervised.

Specifically, the adaptive training implemented on the voice instruction conversion model being supervised refers to that:

the conversion module 102 converts the voice signal into the prediction instruction according to the voice instruction conversion model; then determines correlation coefficients between the prediction instruction and a corresponding instruction set, in which the instruction set is a set of instructions obtained manually from the voice signals; and the conversion module 102 optimizes the voice instruction conversion model according to the correlation coefficients between the prediction instruction and the corresponding instruction set to obtain the target voice instruction conversion model.

In an example, the image processing device 100 may further include:

a training module 105 configured to convert the voice signal into a prediction instruction according to the voice instruction conversion model; determine correlation coefficients between the prediction instruction and a corresponding instruction set; and optimize the voice instruction conversion model according to the correlation coefficients between the prediction instruction and the corresponding instruction set to obtain the target voice instruction conversion model.

For example, the adaptive training implemented on a voice instruction conversion model being supervised may include: the conversion module 102 or the training module 105 receives a segment of voice signals containing relevant commands such as changing a color of an image or rotating an image. Each command corresponds to an instruction set. For an input voice signal used for adaptive training, a corresponding instruction set is known. The conversion module 102 or the training module 105 takes the voice signals as input data of the voice instruction conversion model to obtain an output prediction instruction. The conversion module 102 or the training module 105 computes the correlation coefficients between the prediction instruction and the corresponding instruction set, adaptively updates parameters (such as weights, biases, and the like) in the voice instruction conversion model to improve performance of the voice instruction conversion model, and then obtains the target voice instruction conversion model.

The image processing device 100 may further include:

a storage module 104 configured to store the text information, the image processing instruction, or the target area.

In an example, the storage module 104, the first storage module, and the second storage module may be identical or different storage modules.

A processing module 103 may be configured to process the image to be processed according to the image processing instruction and the target image processing model.

The processing module 103 may include:

an obtaining unit 1031 configured to obtain M image processing instructions from the storage module in the preset time window, in which the M is an integer greater than 1; and a processing unit 1032 configured to process the target area according to the M image processing instructions and the target image processing model.

In an example, the processing unit 1032 may be configured to:

delete the image processing instructions with identical functionalities in the M image processing instructions to obtain N image processing instructions, in which the N is an integer smaller than the M; and process the target area according to the N image processing instructions and the target image processing model.

Specifically, the preset time window may refer to a preset time period. After the obtaining unit 1031 obtains M image processing instructions from the storage module 104 in the preset time period, the processing unit 1032 compares every two of the M image processing instructions, deletes instructions with identical functionalities from the M image processing instructions, and obtains N image processing instructions. The processing unit 1032 processes the image to be processed according to the N processing instructions and the target image processing model.

Examples are given to illustrate the method of the processing unit 1032 comparing every two of the M image processing instructions. When an image processing instruction A and an image processing instruction B are identical, the processing unit 1032 deletes the one with bigger overhead in the image processing instruction A and the image processing instruction B; and when the image processing instruction A and the image processing instruction B are different, the processing unit 1032 obtains a similarity coefficient between the image processing instruction A and the image processing instruction B. When the similarity coefficient is greater than a similarity threshold, it is determined that the image processing instruction A and the image processing instruction B have identical functionalities, and the processing unit 1032 deletes the one with bigger overhead in the image processing instruction A and the image processing instruction B; when the similarity coefficient is lower than the similarity threshold, the processing unit 1032 determines that the image processing instruction A and B have different functionalities. The image processing instructions A and B refer to any two of the M processing instructions.

Specifically, both input and output of the processing module 103 are images. The processing module 103 may process the image to be processed by methods including but not limited to ANN and traditional computer vision-based methods, the processing including but not limited to: body shape (such as leg sliming and breast augmentation), face change, face beautification, object change (a dog for a cat, a zebra for a horse, an orange for an apple, etc.), background change (a forest for a field), de-occlusion (such as reconstructing an occluded eye on the face), style change (changing into a Van Gogh style in one second), pose change (such as standing for sitting, a frontal face for a profile), changing a non-oil painting to an oil painting, and changing a background color of an image and a background season of an object in the image.

In an example, before the receiving module 101 receives the voice signal and the image to be processed, the processing module 103 may implement adaptive training on an image processing model to obtain the target image processing model.

The adaptive training on the image processing model is implemented offline or online.

Specifically, the adaptive training on the image processing model being implemented offline refers to that the processing module 103 may implement adaptive training on the image processing model on the basis of hardware of the processing module 103 to obtain the target voice instruction conversion model; the adaptive training on the image processing model being implemented online refers to that the cloud server different from the conversion model may implement adaptive training on the image processing model to obtain a target image processing model. When the processing module 103 needs to use the target image processing model, the processing module 103 obtains the target image processing model from the cloud server.

In an example, the adaptive training implemented on an image processing model is supervised or unsupervised.

Specifically, the adaptive training implemented on the image processing model being supervised refers to that: the processing module 103 converts the voice signal into the predicted image according to the image processing model; then determines correlation coefficients between the predicted image and the corresponding target image, in which the target is an image obtained by manually processing the image to be processed according to the voice signal; and the processing module 103 optimizes the image processing model according to the correlation coefficients between the predicted image and the corresponding target image to obtain the target image processing model.

In an example, the image processing device 100 may further include:

a training module 105 configured to convert the voice signal into the prediction instruction according to the voice instruction conversion model; determine correlation coefficients between the prediction instruction and the corresponding instruction set; and optimize the voice instruction conversion model according to the correlation coefficients between the prediction instruction and the corresponding instruction set to obtain the target voice instruction conversion model.

For example, the adaptive training implemented on an image processing model being supervised may include: the processing module 103 or the training module 105 receives a segment of voice signals containing relevant commands such as changing a color of an image or rotating an image. Each command corresponds to one target image. For the input voice signal used for adaptive training, the corresponding target image is known. The processing module 103 or the training module 105 takes the voice signals as the input data of the image processing model to obtain an output predicted image. The processing module 103 or the training module 105 computes the correlation coefficients between the predicted image and the corresponding target image, adaptively updates parameters (such as weights, biases, and the like.) in the image processing model to improve performance of the image processing model, and then obtains the target image processing model.

In an example, the conversion module 102 of the image processing device 100 may be configured to implement the adaptive training on the voice instruction conversion model in the conversion module 102 to obtain the target voice instruction conversion model; and the processing module 103 of the image processing device 100 may be configured to implement the adaptive training on the image processing model in the processing module 103 to obtain the target image processing model.

In an example, the image processing device 100 may further include:

a training module 105 configured to implement adaptive training on the voice instruction conversion model in the conversion module 102 and the image processing model in the processing module 103 respectively to obtain the target voice instruction conversion model and the target image processing model.

The training module 105 is capable of adjusting the structure and parameters of the voice instruction conversion model or the image processing model in a supervised or unsupervised manner to improve performance of the voice instruction conversion model or the image processing model and finally obtain the target voice instruction conversion model or the target image processing model.

In the present example, the image processing device 100 is presented in the form of modules. The "Module" may refer to an application-specific integrated circuit (ASIC), a processor and a memory executing one or more software or firmware programs, an integrated logic circuit, and/or other components that provide the described functionalities. In addition, the receiving module 101, the conversion module 102, the processing module 103, the storage module 104, and the training module 105 may be realized by the artificial neural network chip shown in FIG. 5, FIG. 6, and FIG. 7.

In an example, the conversion module 102 of the image processing device 100 or the processing unit 1032 of the processing module 103 is an artificial neural network chip, which means that the conversion module 102 and the processing unit 1032 of the processing module 103 are two independent artificial neural network chips. The structures of the conversion module 102 and the processing unit 1032 are shown in FIG. 5 and FIG. 6 respectively.

In the present device, the conversion module 102 and the processing module 103 may be performed either serially or in a soft-pipelining manner, which means that the conversion module 102 may process a next image when the processing module 103 processes a previous image, which may improve hardware throughput and image processing efficiency.

Figure 5:
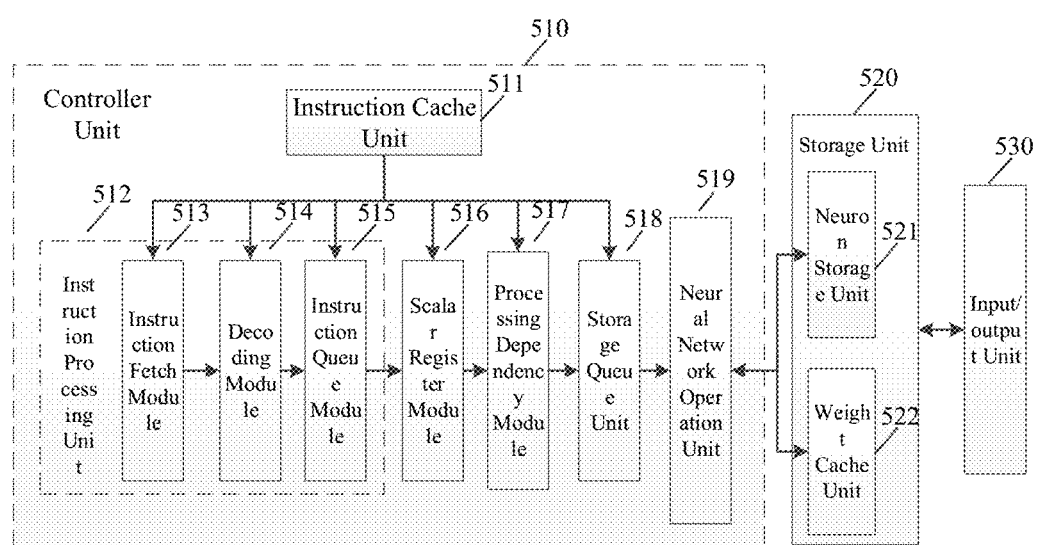
FIG. 5 is a structural diagram of a chip according to one example of the present disclosure.
Figure 6:
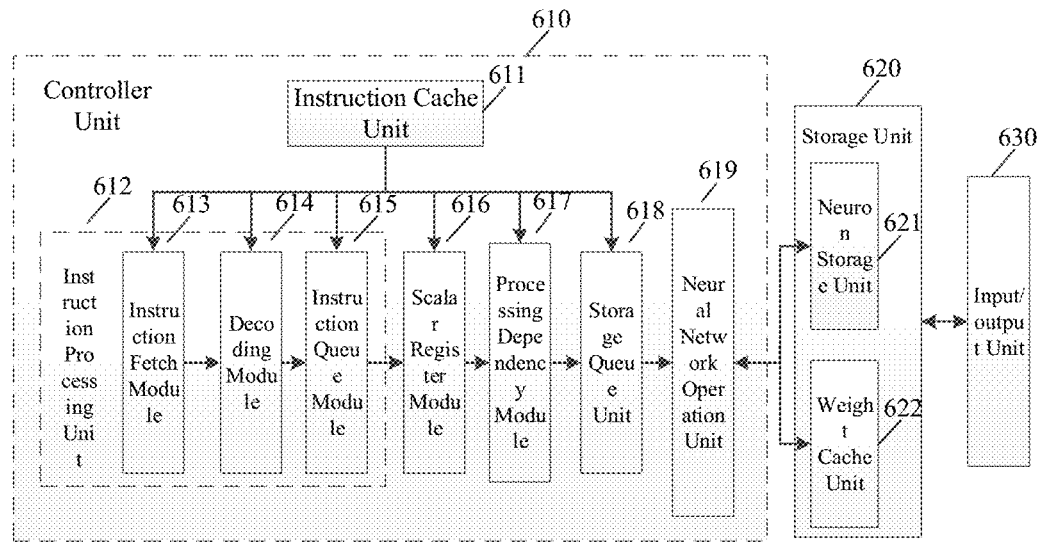
FIG. 6 is a structural diagram of another chip according to one example of the present disclosure.

Referring to FIG. 5, FIG. 5 is the structural frame diagram of the artificial neural network chip. As shown in FIG. 5, the chip may include:

a control unit 510, a storage unit 520, and an input/output unit 530.

The control unit 510 may include:

an instruction cache unit 511 configured to store instructions to be performed, the instructions including a neural network operation instruction and a universal operation instruction, and in an example, the instruction cache unit 511 may be a reordered cache;

an instruction processing module 512 configured to obtain a neural network operation instruction or a universal operation instruction from the instruction cache unit, process the instruction, and provide the instruction to the neural network operation unit 519. The instruction processing module 512 may include:

an instruction fetch module 513 configured to obtain an instruction from the instruction cache unit;

a decoding module 514 configured to decode the obtained instruction;

an instruction queue module 515 configured for sequential storage of the decoded instruction;

a scalar register module 516 configured to store operation codes and operands corresponding to the instruction including neural network operation codes and operands corresponding to the neural network operation instruction, and universal operation codes and operands corresponding to the universal operation instruction.

The control unit 510 may further include:

a processing dependency module 517 configured to judge an instruction sent by the instruction processing module 512, and operation codes and operands corresponding to the instruction, and determine whether the instruction accesses the same data as the previous instruction. If the instruction accesses the same data as the previous instruction, store the instruction in the storage queue unit 518, and when the previous instruction is performed, provide the instruction in the storage queue unit to the neural network operation unit 519; otherwise, directly provide the instruction to the neural network operation unit 519.

The control unit 510 may further include:

a storage queue unit 518 configured to store and access two consecutive instructions in the same storage space when the instructions access the storage unit.

Specifically, in order to ensure the correctness of execution results of the two consecutive instructions, if the current instruction is detected to have a dependency on data of the previous instruction, the two consecutive instructions must wait in the storage queue unit 518 for the dependency to be eliminated before being provided to the neural network operation unit.

The control unit 510 may further include:

a neural network operation unit 519 configured to process instructions transmitted by the instruction processing unit or the storage queue unit.

The storage unit 520 may include a neuron cache unit 521 and a weight cache unit 522. A neural network data model is stored in the neuron cache unit 521 and the weight cache unit 522.

The input/output unit 530 may be configured to input the voice signal and output the image processing instruction.

In an example, the storage unit 520 may be a scratchpad memory and the input/output unit 530 may be an IO direct memory access module.

Specifically, the chip 500 (the processing module 102) converting the voice signal into the image processing instruction may include:

in step 501, fetching, by the instruction fetch module 513, an operation instruction for voice recognition from the instruction cache unit 511, and sending the operation instruction to the decoding module 514;

in step 502, decoding, by the decoding module 514, the operation instruction, and sending the decoded instruction to the instruction queue unit 515;

in step 503, obtaining the neural network operation codes and the neural network operation operands corresponding to the instruction from the scalar register module 516;

in step 504, sending the instruction to the processing dependency module 517; judging, by the processing dependency module 517, the operation codes and the operands corresponding to the instruction, and determining whether the instruction has the dependency on the previous instruction which has not been performed in terms of data; if the dependency does not exist, directly sending the instruction to the neural network operation unit 519; if the dependency exists, the instruction needs to wait in the storage queue unit 518 until the dependency on the previous instruction which has not been performed in terms of data does not exist, and then sending the instruction to the neural network operation unit 519;

in step 505, determining, by the neural network operation unit 519, the address and size of required data according to the operation codes and the operands corresponding to the instruction, and extracting the required data from the storage unit 520 including voice instruction conversion model data and the like; and in step 506, performing, by the neural network operation unit 519, a neural network operation corresponding to the instruction, completing corresponding processing, obtaining an image processing instruction, and writing the image processing instruction back to the storage unit 520.

Referring to FIG. 6, FIG. 6 is the structural frame diagram of another artificial neural network chip. As shown in FIG. 6, the chip may include:

a control unit 610, a storage unit 620, and an input/output unit 630.

The control unit 610 may include:

an instruction cache unit 611 configured to store instructions to be performed, the instructions including the neural network operation instructions and the universal operation instructions, and in an example, the instruction cache unit 611 may be the reordered cache;

an instruction processing module 612 configured to obtain the neural network operation instruction or the universal operation instruction from the instruction cache unit, process the instruction, and provide the instruction to the neural network operation unit 619. The instruction processing module 612 may include:

an instruction fetch module 613 configured to obtain an instruction from the instruction cache unit;

a decoding module 614 configured to decode the obtained instruction;

an instruction queue module 615 configured for sequential storage of the decoded instruction; and a scalar register module 616 configured to store operation codes and operands corresponding to the instruction including the neural network operation codes and the operands corresponding to the neural network operation instruction, and universal operation codes and operands corresponding to the universal operation instruction.

The control unit 610 may further include:

a processing dependency module 617 configured to judge the instruction sent by the instruction processing module 612, and the operation codes and operands corresponding to the instruction, and determine whether the instruction accesses the same data as the previous instruction. If the instruction accesses the same data as the previous instruction, store the instruction in the storage queue unit 618, and when the previous instruction is performed, provide the instruction in the storage queue unit to the neural network operation unit 619; otherwise, directly provide the instruction to the neural network operation unit 619; and a storage queue unit 618 configured to store and access two consecutive instructions in the same storage space when instructions access the storage unit.

Specifically, in order to ensure the correctness of execution results of the two consecutive instructions, if the current instruction is detected to have the dependency on data of the previous instruction, the two consecutive instructions must wait in the storage queue unit 618 for the dependency to be eliminated before being provided to the neural network operation unit.

The control unit 610 may further include:

a neural network operation unit 619 configured to process instructions transmitted by the instruction processing unit or the storage queue unit.

The storage unit 620 may include a neuron cache unit 621 and a weight cache unit 622. A neural network data model is stored in the neuron cache unit 621 and the weight cache unit 622.

The input/output unit 630 may be configured to input the image processing instruction and the image to be processed, and output the processed image.

In an example, the storage unit 620 may be a scratchpad memory and the input/output unit 630 may be an IO direct memory access module.

The processing unit 1032 of the chip (the processing module 103) processing an image may include:

in step 601, fetching, by the instruction fetch module 613, the image processing instruction generated by the conversion module from the instruction cache unit 611, and sending the operation instruction to the decoding module 614;

in step 602, decoding, by the decoding module 614, the operation instruction, and sending the decoded instruction to the instruction queue unit 815;

in step 603, obtaining the neural network operation codes and the neural network operation operands corresponding to the instruction from the scalar register module 616;

in step 604, sending the instruction to the processing dependency module 617; judging, by the processing dependency module 617, the operation codes and the operands corresponding to the instruction, and determining whether the instruction has the dependency on the previous instruction which has not been performed in terms of data; if the dependency does not exist, directly sending the instruction to the neural network operation unit 619; if the dependency exists, the instruction needs to wait in the storage queue unit 618 until the dependency on the previous instruction which has not been performed in terms of data does not exist, and then sending a microinstruction corresponding to the instruction to the neural network operation unit 619;

in step 605, determining, by the neural network operation unit 619, the address and size of required data according to the operation codes and the operands corresponding to the instruction, and extracting the required data from the storage unit 620 including the image to be processed, the image processing model data, and the like; and in step 606, performing, by the neural network operation unit 619, the neural network operation corresponding to the instruction, completing corresponding processing, and writing the processing results back to the storage unit 620.

It should be noted that both the conversion module 102 and the processing unit 1032 of the processing module 103 may be artificial neural network chips or universal processing chips, or one of the conversion module 102 and the processing unit 1032 of the processing module 103 is the artificial neural network chip, while the other is the universal processing chip.

Alternatively, the image processing device may be a data processing device, a robot, a computer, a tablet, an intelligent terminal, a mobile phone, a cloud server, a camera, a video camera, a projector, a watch, an earphone, a mobile storage, or a wearable device.

It may be seen that in the scheme of the example of the present disclosure, the receiving module receives and obtains the voice signal and the image to be processed; the conversion module converts the voice signal into the image processing instruction and the area to be processed according to the target voice instruction conversion model; and the processing module converts the voice signal into the image processing instruction and the image to be processed according to the image processing instruction and the target image processing model. Compared with existing image processing technology, the disclosure processes images through voice, which may save users' time spent in learning image processing software prior to image processing and improve user experience.

In a second aspect, examples further provide an image processing device including:

a receiving module configured to receive a voice signal and an image to be processed;

a conversion module configured to convert the voice signal into an image processing instruction and a target area according to a target voice instruction conversion model, and the target area is a processing area of the image to be processed; and a processing module configured to process the target area according to the image processing instruction and the target image processing model.

The conversion module may be specifically configured to:

convert the voice signal into the text information through the voice recognition technology;

convert the text information into the image processing instruction through the natural language processing technology and the target voice instruction conversion model; and divide the image to be processed into areas according to granularity of semantic areas in the image processing instruction and an image recognition technology, and obtain the target area.

The conversion module may be further specifically configured to:

convert the voice signal into the image processing instruction through the voice recognition technology, the semantic understanding technology, and the target voice instruction conversion model;

divide the image to be processed into areas according to the granularity of semantic areas in the image processing instruction and the image recognition technology, and obtain the target area.

The image processing device may further include the storage module configured to store the text information, the image processing instruction, or the target area.

The processing module may be specifically configured to:

obtain M image processing instructions from the storage module in the preset time window, in which the M is an integer greater than 1; and process the target area according to the M image processing instructions and the target image processing model.

The processing module may be further specifically configured to:

delete the image processing instructions with identical functionalities in the M image processing instructions to obtain N image processing instructions, in which the N is an integer smaller than the M; and process the target area according to the N image processing instructions and the target image processing model.

The conversion module may be configured to implement adaptive training on the voice instruction conversion model to obtain the target voice instruction conversion model.

The conversion module may implement adaptive training on the voice instruction conversion model either offline or online.

The adaptive training implemented by the conversion module on the voice instruction conversion module is supervised or unsupervised.

The conversion module may be further configured to:

convert the voice signal into the prediction instruction according to the voice instruction conversion model;

determine correlation coefficients between the prediction instruction and the corresponding instruction set; and optimize the voice instruction conversion model according to the correlation coefficients between the prediction instruction and the corresponding instruction set to obtain the target voice instruction conversion model.

The image processing device may further include:

the training module configured to convert the voice signal into the prediction instruction according to the voice instruction conversion model, determine correlation coefficients between the prediction instruction and the corresponding instruction set, and optimize the voice instruction conversion model according to the correlation coefficients between the prediction instruction and the corresponding instruction set to obtain the target voice instruction conversion model.

The processing module may be configured to implement adaptive training on the image processing model to obtain the target image processing model.

The processing module may implement adaptive training on the image processing model either offline or online.

The adaptive training implemented by the processing module on the image processing module is supervised or unsupervised.

The processing module may be further configured to:

process the image to be processed according to the image processing model to obtain the predicted image;

determine correlation coefficients between the predicted image and the corresponding target image; and optimize the image processing model according to the correlation coefficients between the predicted image and the corresponding target image to obtain the target image processing model.

The training module may be further configured to:

process the image to be processed according to the image processing model to obtain the predicted image;

determine correlation coefficients between the predicted image and the corresponding target image; and optimize the image processing model according to the correlation coefficients between the predicted image and the corresponding target image to obtain the target image processing model.

It should be noted that the implementation process of the above image processing device will not be described here. For the details, refer to the specific implementation process of the example shown in FIG. 1.

Figure 7:
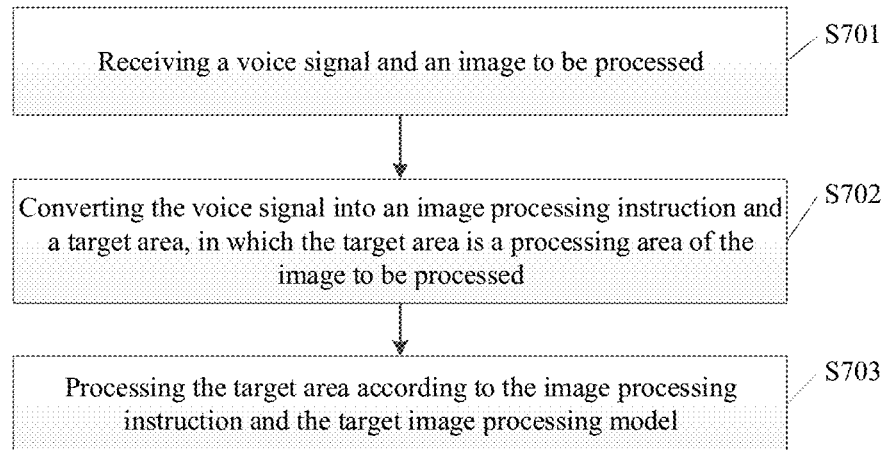
FIG. 7 is a flow chart of an image processing method according to one example of the present disclosure.

In a third aspect, examples provide an image processing method. As shown in FIG. 7, the method includes:

In step 701, receiving, by the image processing device, the voice signal and the image to be processed, and In step 702, converting, by the image processing device, the voice signal into the image processing instruction and the target area according to the target voice instruction conversion model, in which the target area is the processing area of the image to be processed.

In an example, the method of converting the voice signal into the image processing instruction and the target area according to the target voice instruction conversion model may include:

converting the voice signal into the text information through the voice recognition technology;

converting the text information into the image processing instruction through the natural language processing technology and the target voice instruction conversion model; and dividing the image to be processed into areas according to the granularity of semantic areas in the image processing instruction and image recognition technology, and obtaining the target area.

In an example, the method of converting the voice signal into the image processing instruction and the target area according to the target voice instruction conversion model may include:

converting the voice signal into the image processing instruction through the voice recognition technology, the semantic understanding technology, and the target voice instruction conversion model; and dividing the image to be processed into areas according to the granularity of semantic areas in the image processing instruction and the image recognition technology, and obtaining the target area.

In an example, the method may further include storing the text information, the image processing instruction, or the target area.

In step 703, the image processing device processes the target area according to the image processing instruction and the target image processing model.

In an example, the processing the target area according to the image processing instruction and the image processing model may include:

obtaining M image processing instructions from the storage module in a preset time window, in which the M is an integer greater than 1; and processing the target area according to the M image processing instructions and the target image processing model.

In an example, the processing the target area according to the M image processing instructions and the target image processing model may include:

deleting image processing instructions with identical functionalities in the M image processing instructions to obtain N image processing instructions, in which the N is an integer smaller than the M; and processing the target area according to the N image processing instructions and the target image processing model.

In an example, prior to the receiving the voice signal and the image to be processed, the method may further include:

implementing adaptive training on the voice instruction conversion model to obtain the target voice instruction conversion model.

In an example, the adaptive training on the voice instruction conversion model is implemented either offline or offline.

In an example, the adaptive training implemented on the voice instruction conversion module is supervised or unsupervised.

In an example, the implementing adaptive training on the voice instruction conversion model to obtain the target voice instruction conversion model may include:

converting the voice signal into the prediction instruction according to the voice instruction conversion model;

determining the correlation coefficients between the prediction instruction and the corresponding instruction set; and optimizing the voice instruction conversion model according to the correlation coefficients between the prediction instruction and the corresponding instruction set to obtain the target voice instruction conversion model.

In an example, prior to the receiving the voice signal and the image to be processed, the method may further include:

implementing adaptive training on the image processing model to obtain the target image processing model.

In an example, the adaptive training on the image processing model is implemented either offline or offline.

In an example, the adaptive training implemented on the image processing model is supervised or unsupervised.

In an example, the implementing adaptive training on the image processing model to obtain the target image processing model may include:

processing the image to be processed according to the image processing model to obtain the predicted image;

determining the correlation coefficients between the predicted image and the corresponding target image; and optimizing the image processing model according to the correlation coefficients between the predicted image and the corresponding target image to obtain the target image processing model.

It should be noted that the specific implementation process of the each step in the method shown in FIG. 7 will not be described here. For the details, refer to the specific implementation process of the above image processing device.

Examples further provides a computer storage medium, in which the computer storage medium is capable of storing a program, and the execution of the program may include some or all of the steps in any one of the image processing methods described in the above method examples.

Figure 8:
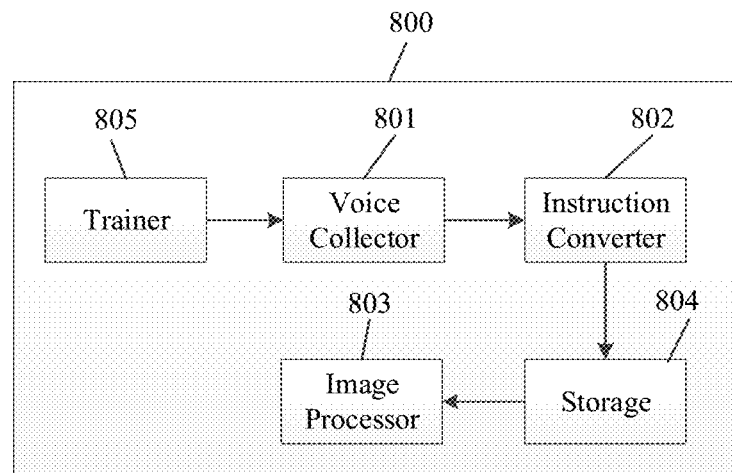
FIG. 8 is a structural diagram of an image processing device according to one example of the present disclosure.
Figure 9:
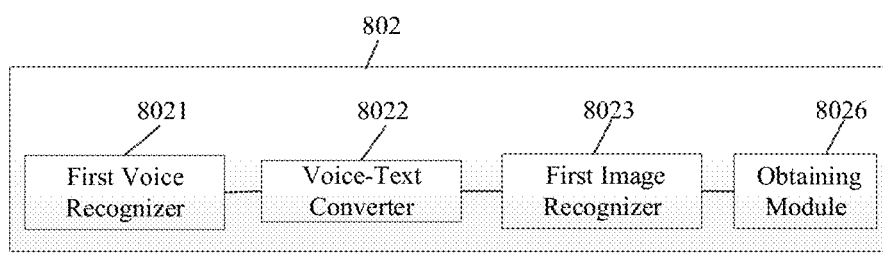
FIG. 9 is a partial structural diagram of another image processing device according to one example of the present disclosure.
Figure 10:
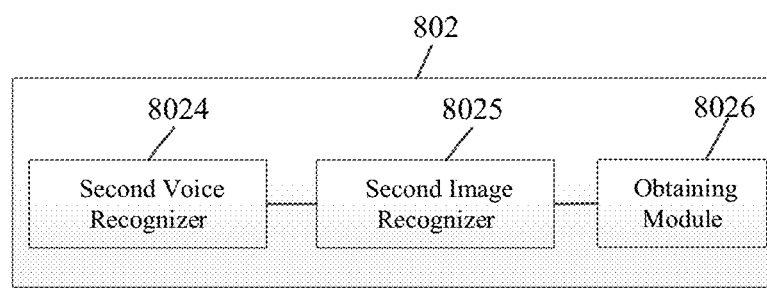
FIG. 10 is a partial structural diagram of another image processing device according to one example of the present disclosure.
Figure 11:
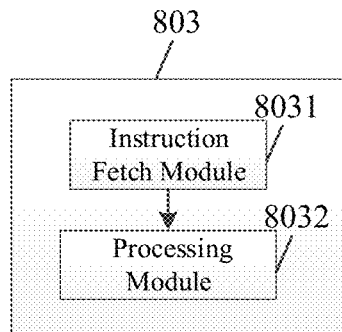
FIG. 11 is a partial structural diagram of another image processing device according to one example of the present disclosure.
Figure 12:
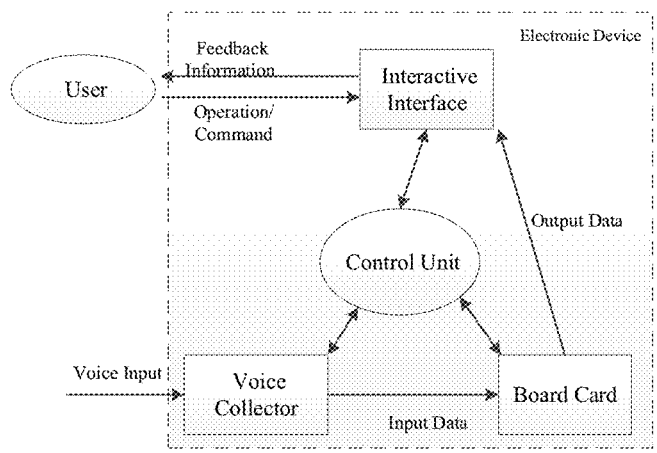
FIG. 12 is a structural diagram of an electronic device according to one example of the present disclosure.

Referring to FIG. 8, FIG. 8 is the structural diagram of the image processing device according to one example of the present disclosure. As shown in FIG. 8, an image processing device 800 includes:

a voice collector 801 configured to collect the voice signal input by users.

In an example, the image processing device 800 may further include a noise filter. After the voice collector 801 collects the voice signal, the noise filter performs noise reduction processing on the voice signal.

In an example, the voice collector may be a voice sensor, a microphone, a pickup, or other audio collection devices.

Specifically, the voice collector 801 also receives an environmental sound signal when receiving the voice signal. The noise filter performs the noise reduction processing on the voice signal according to the environmental sound signal. For the voice signal, the environmental sound signal is noise.

Furthermore, the voice collector may include a microphone array configured to collect the voice signal and the environmental voice signal, and reduce noise.

In an example, the image processing device may further include a first storage module. After the voice collector collects the voice signal, the image processing device stores the voice signal in the first storage module.

An instruction converter 802 may be configured to convert the voice signal into the image processing instruction and the target area according to the target voice instruction conversion model, in which the target area is the processing area of the image to be processed.

In an example, the instruction converter 802 obtains the voice processing signal from the first storage module prior to converting the voice signal into the image processing instruction and the target area according to the voice recognition technology, the natural language processing technology, and the image recognition technology.

The instruction converter 802 may include:

a first voice recognizer 8021 configured to convert the voice signal into the text information through the voice recognition technology;

a voice-text converter 8022 configured to convert the text information into the image processing instruction through the natural language processing technology and the target voice instruction conversion model;

a first image recognizer 8023 configured to divide the image to be processed into areas according to the granularity of semantic areas in the image processing instruction and the image recognition technology, and obtain the target area.

Furthermore, the instruction converter 802 may include an obtaining module 8026 configured to obtain the granularity of semantic areas in the image processing instruction.

Examples are given to illustrate the semantic areas hereinafter. If the image processing device 800 determines a face area as the target area according to the voice signal, the semantic area refers to the face area in the image to be processed. The image processing device determines a face as the granularity to obtain a plurality of face areas in the image to be processed; when a background is determined as the target area, the image processing device divides the image to be processed into a background area and a non-background area; when a red-color area is determined as the target area, the image processing device divides the image to be processed into areas in different colors.

Specifically, the voice recognition technology used in the present disclosure may include but not limited to an artificial neural network (ANN), a Hidden Markov Model (HMM), and other models. The first voice recognition unit is capable of processing the voice signal according to the voice recognition technology; the natural language processing technology may include but not limited to a statistical machine learning, ANN, and other methods, and the semantic understanding unit is capable of extracting semantic information according to the natural language processing technology; the image recognition technology may include but not limited to an edge-detection-based algorithm, a threshold segmentation algorithm, a region growing and watershed algorithm, a grayscale integral projection curve analysis algorithm, a template matching algorithm, a deformable template algorithm, a Hough transform algorithm, a Snake operator algorithm, an elastic image matching technology based on Gabor wavelet transform, an active shape model, an active appearance model, and the like. The image recognition unit is capable of segmenting the image to be processed into different areas according to the image recognition technology.

In an example, the first voice recognition unit 8021 converts the voice signal into the text information through the voice recognition technology, and stores the text information into the first storage module. The voice-text converter 8022 obtains the text information from the first storage module, converts the text information into the image processing instruction through the natural language processing technology and the target voice instruction conversion model, and stores the image processing instruction in the first storage module; the first image recognition unit 8023 divides the image to be processed into areas according to the granularity of semantic areas in the image processing instruction and the image recognition technology, obtains the target area, and then stores the dividing results and the target areas into the second storage module.

In an example, the instruction converter 802 may further include:

a second voice recognition unit 8024 configured to directly convert the voice signal into the image processing instruction according to the voice recognition technology, the natural language processing technology, and the target voice instruction conversion model, and store the image processing instruction into the first storage module; and a second image recognition unit 8025 configured to divide the image to be processed according to the granularity of the semantic areas in which the image processing instruction performs operation on the image to be processed, obtain the target area in which the target area refers to the area processing the image to be processed, and store the dividing results and the target area into the second storage module.

In an example, before the voice collector 801 collects the voice signal and the image to be processed, the instruction converter 802 may implement adaptive training on the voice instruction conversion model to obtain the target voice instruction conversion model.

The adaptive training on the voice instruction conversion model is implemented offline or online.

Specifically, the adaptive training on the voice instruction conversion model being implemented offline refers to that the instruction converter 802 may implement adaptive training on the voice instruction conversion model on the basis of hardware of the converter 802 to obtain the target voice instruction conversion model; the adaptive training on the voice instruction conversion model being implemented online refers to that a cloud server different from the conversion model may implement adaptive training on the voice instruction conversion model to obtain the target voice instruction conversion model. When the converter 802 needs to use the target voice instruction conversion model, the converter 802 obtains the target voice instruction conversion model from the cloud server.

In an example, the adaptive training implemented on a voice instruction conversion model is supervised or unsupervised.

Specifically, the adaptive training implemented on the voice instruction conversion model being supervised refers to that:

the instruction converter 802 converts the voice signal into the prediction instruction according to the voice instruction conversion model; then determines correlation coefficients between the prediction instruction and the corresponding instruction set, in which the instruction set is a set of instructions obtained manually from the voice signals; and the conversion module 102 optimizes the voice instruction conversion model according to the correlation coefficients between the prediction instruction and the corresponding instruction set to obtain the target voice instruction conversion model.

In an example, the image processing device 800 may further include:

a trainer 805 configured to convert the voice signal into the prediction instruction according to the voice instruction conversion model; determine correlation coefficients between the prediction instruction and the corresponding instruction set; and optimize the voice instruction conversion model according to the correlation coefficients between the prediction instruction and the corresponding instruction set to obtain the target voice instruction conversion model.

For example, the adaptive training implemented on a voice instruction conversion model being supervised may include: the instruction converter 802 or the trainer 805 receives a segment of voice signals containing relevant commands such as changing the color of an image or rotating an image. Each command corresponds to one instruction set. For the input voice signal used for adaptive training, the corresponding instruction set is known. The instruction converter 802 or the trainer 805 takes the voice signals as the input data of the voice instruction conversion model to obtain the output prediction instruction. The instruction converter 802 or the trainer 805 computes the correlation coefficients between the prediction instruction and the corresponding instruction set, adaptively updates the parameters (such as weights, biases, and the like) in the voice instruction conversion model to improve performance of the voice instruction conversion model, and then obtains the target voice instruction conversion model.

The image processing device 800 may further include:

a storage module 804 configured to store the text information, the image processing instruction, or the target area.

In an example, the storage module 804, the first storage module, and the second storage module may be identical or different storage modules.

An image processor 803 may be configured to process the image to be processed according to the image processing instruction and the target image processing model.

The image processor 803 may include:

an instruction fetch module 8031 configured to obtain M image processing instructions from the storage module in the preset time window, in which the M is an integer greater than 1; and a processing module 8032 configured to process the target area according to the M image processing instructions and the target image processing model.

Alternatively, the processing module 8032 may be configured to:

delete the image processing instructions with identical functionalities in the M image processing instructions to obtain N image processing instructions, in which the N is an integer smaller than the M; and process the target area according to the N image processing instructions and the target image processing model.

Specifically, the preset time window may refer to the preset time period. After the instruction fetch module 8031 obtains M image processing instructions from the storage module 804 in the preset time period, the processing module 8032 compares every two of the M image processing instructions, deletes instructions with identical functionalities from the M image processing instructions, and obtains N image processing instructions. The processing module 8032 processes the image to be processed according to the N processing instructions and the target image processing model.

Examples are given to illustrate the method of the processing module 8032 comparing every two of the M image processing instructions. When an image processing instruction A and an image processing instruction B are identical, the processing module 8032 deletes the one with bigger overhead in the image processing instruction A and the image processing instruction B; and when the image processing instruction A and the image processing instruction B are different, the processing module 8032 obtains a similarity coefficient between the image processing instruction A and the image processing instruction B. When the similarity coefficient is greater than a similarity threshold, it is determined that the image processing instruction A and the image processing instruction B have identical functionalities, and the processing module 8032 deletes the one with bigger overhead in the image processing instruction A and the image processing instruction B; when the similarity coefficient is lower than the similarity threshold, the processing module 8032 determines that the image processing instruction A and B have different functionalities. The image processing instructions A and B refer to any two of the M processing instructions.

Specifically, both input and output of the image processor 803 are images. The image processor 803 may process the image to be processed by methods including but not limited to ANN and traditional computer vision-based methods, the processing including but not limited to: body shape (such as leg sliming and breast augmentation), face change, face beautification, object change (a dog for a cat, a zebra for a horse, an orange for an apple, and the like), background change (a forest for a field), de-occlusion (such as reconstructing an occluded eye on the face), style change (changing into a Van Gogh style in one second), pose change (such as standing for sitting, a frontal face for a profile), changing a non-oil painting to an oil painting, and changing a background color of an image and a background season of an object in the image.

In an example, before the voice collector 801 receives the voice signal, the image processor 803 may implement adaptive training on an image processing model to obtain the target image processing model.

The adaptive training on the image processing model is implemented offline or online.

Specifically, the adaptive training on the image processing model being implemented offline refers to that the image processor 803 may implement adaptive training on the image processing model on the basis of hardware of the image processor 803 to obtain the target voice instruction conversion model; the adaptive training on the image processing model being implemented online refers to that the cloud server different from the image processor 803 may implement adaptive training on the image processing model to obtain a target image processing model. When the image processor 803 needs to use the target image processing model, the image processor 803 obtains the target image processing model from the cloud server.

In an example, the adaptive training implemented on an image processing model is supervised or unsupervised.

Specifically, the adaptive training implemented on the image processing model being supervised refers to that the image processor 803 converts the voice signal into the predicted image according to the image processing model; then determines correlation coefficients between the predicted image and the corresponding target image, in which the target is the image obtained by manually processing the image to be processed according to the voice signal; and the image processor 803 optimizes the image processing model according to the correlation coefficients between the predicted image and the corresponding target image to obtain the target image processing model.

In an example, the image processing device 800 may further include:

a trainer 805 configured to convert the voice signal into the prediction instruction according to the voice instruction conversion model; determine correlation coefficients between the prediction instruction and the corresponding instruction set; and optimize the voice instruction conversion model according to the correlation coefficients between the prediction instruction and the corresponding instruction set to obtain the target voice instruction conversion model.

For example, the adaptive training implemented on an image processing model being supervised may include: the image processor 803 or the trainer 805 receives a segment of voice signals containing relevant commands such as changing the color of an image or rotating an image. Each command corresponds to one target image. For the input voice signal used for adaptive training, the corresponding target image is known. The image processor 803 or the trainer 805 takes the voice signals as the input data of the image processing model to obtain an output predicted image. The processor 803 or the trainer 805 computes the correlation coefficients between the predicted image and the corresponding target image, adaptively updates parameters (such as weights, biases, and the like.) in the image processing model to improve performance of the image processing model, and then obtains the target image processing model.

In an example, the instruction converter 802 of the image processing device 800 may be configured to implement the adaptive training on the voice instruction converter model in the instruction converter 802 to obtain the target voice instruction converter model; and the image processor 803 of the image processing device 800 may be configured to implement the adaptive training on the image processing model in the image processor 803 to obtain the target image processing model.

In an example, the image processing device 800 may further include the trainer 805 configured to implement adaptive training on the voice instruction conversion model in the instruction converter 802 and the image processing model in the image processor 803 respectively to obtain the target voice instruction conversion model and the target image processing model.

The trainer 805 is capable of adjusting the structure and parameters of the voice instruction conversion model or the image processing model in a supervised or unsupervised manner to improve performance of the voice instruction conversion model or the image processing model and finally obtain the target voice instruction conversion model or the target image processing model.

In the present example, the image processing device 800 is presented in the form of modules. The "Module" may refer to an application-specific integrated circuit (ASIC), a processor and a memory executing one or more software or firmware programs, an integrated logic circuit, and/or other components that provide the described functionalities. In addition, the voice collector 801, the instruction converter 802, the image processor 803, the storage module 804, and the trainer 805 may be realized by the artificial neural network chip shown in FIG. 5, FIG. 6, FIG. 8 and FIG. 12.

In an example, the instruction converter 802 of the image processing device 800 or the processing module 8032 of the image processor 803 is the artificial neural network chip, which means that the instruction converter 802 and the processing module 8032 of the image processor 803 are two independent artificial neural network chips. The structures of the instruction converter 802 and the processing module 8032 are shown in FIG. 5 and FIG. 6 respectively.

In the present device, the instruction converter 802 and the image processor 803 may be performed either serially or in the soft-pipelining manner, which means that the instruction converter 802 may process the next image when the image processor 803 processes the previous image, which may improve hardware throughput and image processing efficiency.

Referring to FIG. 5, FIG. 5 is the structural frame diagram of the artificial neural network chip. As shown in FIG. 5, the chip may include:

the control unit 510, the storage unit 520, and the input/output unit 530.

The control unit 510 may include:

the instruction cache unit 511 configured to store instructions to be performed, the instructions including the neural network operation instruction and the universal operation instruction, and in an example, the instruction cache unit 511 may be the reordered cache;

the instruction processing module 512 configured to obtain the neural network operation instruction or the universal operation instruction from the instruction cache unit, process the instruction, and provide the instruction to the neural network operation unit 519. The instruction processing module 512 may include:

the instruction fetch module 513 configured to obtain the instruction from the instruction cache unit;

the decoding module 514 configured to decode the obtained instruction;

the instruction queue module 515 configured for sequential storage of the decoded instruction;

the scalar register module 516 configured to store operation codes and operands corresponding to the instruction including neural network operation codes and operands corresponding to the neural network operation instruction, and universal operation codes and operands corresponding to the universal operation instruction.

The control unit 510 may further include:

the processing dependency module 517 configured to judge the instruction sent by the instruction processing module 512, and operation codes and operands corresponding to the instruction, and determine whether the instruction accesses the same data as the previous instruction. If the instruction accesses the same data as the previous instruction, store the instruction in the storage queue unit 518, and when the previous instruction is performed, provide the instruction in the storage queue unit to the neural network operation unit 519; otherwise, directly provide the instruction to the neural network operation unit 519.

The control unit 510 may further include:

the storage queue unit 518 configured to store and access two consecutive instructions in the same storage space when the instructions access the storage unit.

Specifically, in order to ensure the correctness of execution results of the two consecutive instructions, if the current instruction is detected to have the dependency on data of the previous instruction, the two consecutive instructions must wait in the storage queue unit 518 for the dependency to be eliminated before being provided to the neural network operation unit.

The control unit 510 may further include:

the neural network operation unit 519 configured to process instructions transmitted by the instruction processing unit or the storage queue unit.

The storage unit 520 may include the neuron cache unit 521 and the weight cache unit 522. A neural network data model is stored in the neuron cache unit 521 and the weight cache unit 522.

The input/output unit 530 may be configured to input the voice signal and output the image processing instruction.

In an example, the storage unit 520 may be the scratchpad memory and the input/output unit 530 may be the IO direct memory access module.

Specifically, the chip 500 (the instruction converter 802) converting the voice signal into the image processing instruction may include:

in step 501, fetching, by the instruction fetch module 513, one operation instruction for voice recognition from the instruction cache unit 511, and sending the operation instruction to the decoding module 514;

in step 502, the decoding module 514 decodes the operation instruction and sends the decoded instruction to the instruction queue unit 515;

in step 503, obtaining the neural network operation codes and the neural network operation operands corresponding to the instruction from the scalar register module 516;

in step 504, sending the instruction to the processing dependency module 517; judging, by the processing dependency module 517, the operation codes and the operands corresponding to the instruction, and determining whether the instruction has the dependency on the previous instruction which has not been performed in terms of data; if the dependency does not exist, directly sending the instruction to the neural network operation unit 519; if the dependency exists, the instruction needs to wait in the storage queue unit 518 until the dependency on the previous instruction which has not been performed in terms of data does not exist, and then sending the instruction to the neural network operation unit 519;

in step 505, determining, by the neural network operation unit 519, the address and size of required data according to the operation codes and the operands corresponding to the instruction, and extracting the required data from the storage unit 520 including voice instruction conversion model data and the like; and in step 506, performing, by the neural network operation unit 519, the neural network operation corresponding to the instruction, completing corresponding processing, obtaining an image processing instruction, and writing the image processing instruction back to the storage unit 520.

It should be noted that the storage unit 520 refers to the on-chip cache unit of the chip shown in FIG. 5.

Referring to FIG. 6, FIG. 6 is the structural frame diagram of another artificial neural network chip. As shown in FIG. 6, the chip may include:

the control unit 610, the storage unit 620, and the input/output unit 630.

The control unit 610 may include:

the instruction cache unit 611 configured to store instructions to be performed, the instructions including the neural network operation instructions and the universal operation instructions, and in an example, the instruction cache unit 611 may be the reordered cache;

the instruction processing module 612 configured to obtain the neural network operation instruction or the universal operation instruction from the instruction cache unit, process the instruction, and provide the instruction to the neural network operation unit 619. The instruction processing module 612 may include:

the instruction fetch module 613 configured to obtain one instruction from the instruction cache unit;

the decoding module 614 configured to decode the obtained instruction;

the instruction queue module 615 configured for sequential storage of the decoded instruction; and the scalar register module 616 configured to store operation codes and operands corresponding to the instruction including the neural network operation codes and the operands corresponding to the neural network operation instruction, and universal operation codes and operands corresponding to the universal operation instruction.

The control unit 610 may further include:

the processing dependency module 617 configured to judge the instruction sent by the instruction processing module 612, and the operation codes and operands corresponding to the instruction, and determine whether the instruction accesses the same data as the previous instruction. If the instruction accesses the same data as the previous instruction, store the instruction in the storage queue unit 618, and when the previous instruction is performed, provide the instruction in the storage queue unit to the neural network operation unit 619; otherwise, directly provide the instruction to the neural network operation unit 619; and the storage queue unit 618 configured to store and access two consecutive instructions in the same storage space when instructions access the storage unit.

Specifically, in order to ensure the correctness of execution results of the two consecutive instructions, if the current instruction is detected to have the dependency on data of the previous instruction, the two consecutive instructions must wait in the storage queue unit 618 for the dependency to be eliminated before being provided to the neural network operation unit.

The control unit 610 may further include:

the neural network operation unit 619 configured to process instructions transmitted by the instruction processing unit or the storage queue unit.

The storage unit 620 may include the neuron cache unit 621 and the weight cache unit 622. The neural network data model is stored in the neuron cache unit 621 and the weight cache unit 622.

The input/output unit 630 may be configured to input the image processing instruction and the image to be processed, and output the processed image.

In an example, the storage unit 620 may be a scratchpad memory and the input/output unit 630 may be an IO direct memory access module.

The specific steps of the processing module 8032 of the chip (the image processor 803) processing the image may include:

in step 601, fetching, by the instruction fetch module 613, the image processing instruction generated by the conversion module from the instruction cache unit 611, and sending the operation instruction to the decoding module 614;

in step 602, decoding, by the decoding module 614, the operation instruction, and sending the decoded instruction to the instruction queue unit 815;

in step 603, obtaining the neural network operation codes and the neural network operation operands corresponding to the instruction from the scalar register module 616;

in step 604, sending the instruction to the processing dependency module 617; judging, by the processing dependency module 617, the operation codes and the operands corresponding to the instruction, and determining whether the instruction has the dependency on the previous instruction which has not been performed in terms of data; if the dependency does not exist, directly sending the instruction to the neural network operation unit 619; if the dependency exists, the instruction needs to wait in the storage queue unit 618 until the dependency on the previous instruction which has not been performed in terms of data does not exist, and then sending the microinstruction corresponding to the instruction to the neural network operation unit 619;

in step 605, determining, by the neural network operation unit 619, the address and size of required data according to the operation codes and the operands corresponding to the instruction, and extracting the required data from the storage unit 620 including the image to be processed, the image processing model data, and the like; and in step 606, performing, by the neural network operation unit 619, the neural network operation corresponding to the instruction, completing corresponding processing, and writing the processing results back to the storage unit 620.

It should be noted that the storage unit 620 refers to the on-chip cache unit of the chip shown in FIG. 6.

It should be noted that both the instruction conversion module 802 and the processing module 8032 of the processing module 803 may be artificial neural network chips or universal processing chips, or one of the conversion module 802 and the processing module 8032 of the processing module 803 is the artificial neural network chip, while the other is the universal processing chip.

Alternatively, the image processing device may be a data processing device, a robot, a computer, a tablet, an intelligent terminal, a mobile phone, a cloud server, a camera, a video camera, a projector, a watch, an earphone, a mobile storage, or a wearable device.

It may be seen that in the scheme of the example of the present disclosure, the receiving module receives and obtains the voice signal and the image to be processed; the conversion module converts the voice signal into the image processing instruction and the area to be processed according to the target voice instruction conversion model; and the processing module converts the voice signal into the image processing instruction and the image to be processed according to the image processing instruction and the target image processing model. Compared with existing image processing technology, the disclosure processes images through voice, which may save users' time spent in learning image processing software prior to image processing and improve user experience.

In an example, an image processing chip may include the image processing device described shown in FIG. 8.

In an example, the chip may include a main chip and a companion chip;

the companion chip may include the device described in the first aspect of the examples; and the main chip may be configured to provide a start signal for the companion chip, control and transmit the image to be processed and the image processing instruction to the companion chip.

The companion chip includes the chips shown in FIG. 5 and FIG. 6.

In an example, the image processing chip can be applied to the camera, the mobile phone, the computer, the tablet, or other image processing devices.

In an example, examples provide a chip package structure, which may include the image processing chip.

In an example, examples provide a board card, which may include the chip package structure.

In an example, examples provide an electronic device, which may include the board card.

In an example, examples provide another electronic device, which may include the board card, an interactive interface, the control unit, and the voice collector.

As shown in FIG. 8, the voice collector may be configured to receive voice, and then transmit the voice and the image to be processed to the chip inside the board card as the input data.

Alternatively, the image processing chip may be the artificial neural network processing chip.

The voice collector may be a microphone or a multi-array microphone.

The chip inside the board card including the examples shown in FIG. 5 and FIG. 6 may be configured to obtain corresponding output data (the processed images) and transmit the corresponding output data to the interactive interface.

The interactive interface may be configured to receive output data of the chip (which can be regarded as an artificial neural network processor) and convert the output data into a suitable form of feedback information to display to users.

The control unit may be configured to receive users' operations or commands and control the operation of the whole image processing device.

Alternatively, the electronic device may be a data processing device, a robot, a computer, a tablet, an intelligent terminal, a mobile phone, a cloud server, a camera, a video camera, a projector, a watch, an earphone, a mobile storage, or a wearable device.

Figure 13:
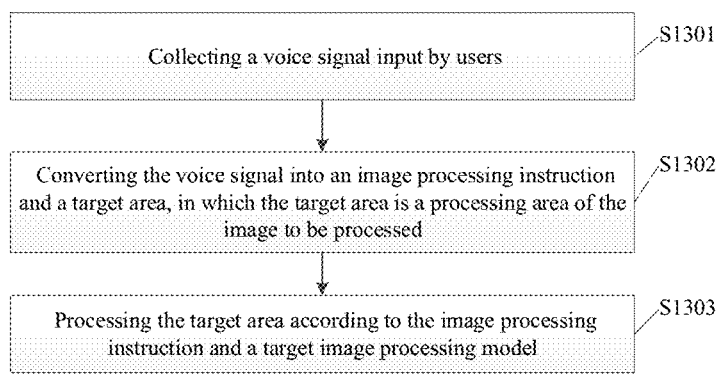
FIG. 13 is a flow chart of an image processing method according to one example of the present disclosure.

Referring to FIG. 13, FIG. 13 is the flow chart of the image processing method according to one example of the present disclosure. As shown in FIG. 13, the method includes:

in step 1301, receiving, by the image processing device, the voice signal input by users; and in step 1302, converting, by the image processing device, the voice signal into the image processing instruction and the target area according to the target voice instruction conversion model, in which the target area is the processing area of the image to be processed.

In an example, the method of converting the voice signal into the image processing instruction and the target area according to the target voice instruction conversion model may include:

converting the voice signal into the text information through the voice recognition technology;

converting the text information into the image processing instruction through the natural language processing technology and the target voice instruction conversion model; and dividing the image to be processed into areas according to granularity of semantic areas in the image processing instruction and image recognition technology, and obtaining the target area.

In an example, the method of converting the voice signal into the image processing instruction and the target area according to the target voice instruction conversion model may include:

converting the voice signal into the image processing instruction through the voice recognition technology, the semantic understanding technology, and the target voice instruction conversion model; and dividing the image to be processed into areas according to the granularity of semantic areas in the image processing instruction and the image recognition technology, and obtaining the target area.

In an example, the method may further include storing the text information, the image processing instruction, or the target area.

In step 1303, processing, by the image processing device, the target area according to the image processing instruction and the target image processing model.

In an example, the processing the target area according to the image processing instruction and the target image processing model may include:

obtaining M image processing instructions from the storage module in the preset time window, in which the M is an integer greater than 1; and processing the target area according to the M image processing instructions and the target image processing model.

In an example, the method of processing the target area according to the M image processing instructions and the target image processing model may include:

deleting the image processing instructions with identical functionalities in the M image processing instructions to obtain N image processing instructions, in which the N is an integer smaller than the M; and processing the target area according to the N image processing instructions and the target image processing model.

In an example, prior to the receiving the voice signal and the image to be processed, the method may further include:

implementing adaptive training on the voice instruction conversion model to obtain the target voice instruction conversion model.

In an example, the adaptive training on the voice instruction conversion model is implemented either offline or offline.

In an example, the adaptive training implemented on the voice instruction conversion module is supervised or unsupervised.

In an example, the implementing adaptive training on the voice instruction conversion model to obtain the target voice instruction conversion model may include:

converting the voice signal into the prediction instruction according to the voice instruction conversion model;

determining the correlation coefficients between the prediction instruction and the corresponding instruction set; and optimizing the voice instruction conversion model according to the correlation coefficients between the prediction instruction and the corresponding instruction set to obtain the target voice instruction conversion model.

In an example, prior to the receiving the voice signal and the image to be processed, the method may further include:

implementing adaptive training on the image processing model to obtain the target image processing model.

In an example, the adaptive training on the image processing model is implemented either offline or offline.

In an example, the adaptive training implemented on the image processing model is supervised or unsupervised.

In an example, the implementing adaptive training on the image processing model to obtain the target image processing model may include:

processing the image to be processed according to the image processing model to obtain the predicted image;

determining the correlation coefficients between the predicted image and the corresponding target image; and optimizing the image processing model according to the correlation coefficients between the predicted image and the corresponding target image to obtain the target image processing model.

It should be noted that the specific implementation process of each step in the method shown in FIG. 13 will not be described here. For the details, refer to the specific implementation process of the image processing device.

Figure 14:
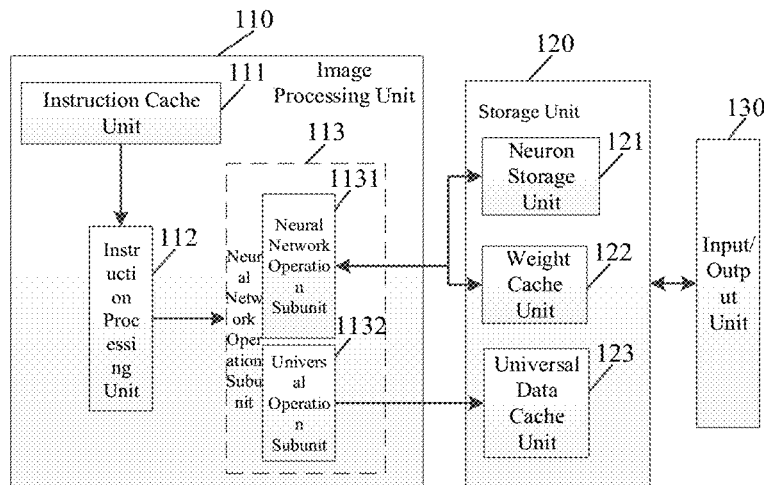
FIG. 14 is a structural diagram of an image processing device according to one example of the present disclosure.

Referring to FIG. 14, FIG. 14 is the structural diagram of the image processing device according to one example of the present disclosure. As shown in FIG. 14, the image processing device includes:

an input/output unit 130 configured to input the voice signal and the image to be processed.

Alternatively, the image processing device may further include the noise filter. After the input/output unit 130 collects the voice signal, the noise filter performs noise reduction processing on the voice signal.

Alternatively, the input/output unit 130 may be a voice sensor, a microphone, a pickup, or other audio collection devices.

Specifically, the input/output unit 130 also receives the environmental sound signal when receiving the voice signal. The noise filter performs the noise reduction processing on the voice signal according to the environmental sound signal. For the voice signal, the environmental sound signal is noise.

Furthermore, the input/output unit 130 may include the microphone array configured to collect the voice signal and the environmental voice signal, and reduce noise.

The image processing device may further include:

an storage unit 120 configured to store the voice signal and the image to be processed; and an image processing unit 110 configured to convert the voice signal into the image processing instruction and the target area, in which the target area is the processing area of the image to be processed, process the target area according to the image processing instruction to obtain the processed image, and store the image to be processed into the storage unit.

Alternatively, the storage unit 120 may include a neuron storage unit 121 and a weight cache unit 122, and a neural network operation unit 113 of the image processing unit 110 may include a neural network operation subunit 1131.

When the neuron storage unit 121 may be configured to store the voice signal and the image to be processed, and the weight cache unit 122 may be configured to store the target voice instruction conversion model and the target image processing model, the neural network operation subunit 1131 may be configured to convert the voice signal into the image processing instruction and the target area according to the target voice instruction conversion model;

the neural network operation subunit 1131 may be further configured to process the target area according to the target image processing model and the image processing instruction to obtain the processed image; and the neural network operation subunit 1131 may be further configured to store the processed image into the neuron storage unit.

Furthermore, the neural network operation subunit 1131 may be specifically configured to:

convert the voice signal into text information through the voice recognition technology;

convert the text information into the image processing instruction through the natural language processing technology and the target voice instruction conversion model; and divide the image to be processed into areas according to the granularity of semantic areas in the image processing instruction and the image recognition technology, and obtain the target area.

Furthermore, the neural network operation subunit 1131 may be specifically configured to:

convert the voice signal into the image processing instruction through the voice recognition technology, the semantic understanding technology, and the target voice instruction conversion model; and divide the image to be processed into areas according to the granularity of semantic areas in the image processing instruction and the image recognition technology, and obtain the target area.

Furthermore, the neuron storage unit 121 may be configured to store the target area and the image processing instruction.

Specifically, the neural network operation subunit 1131 may be configured to:

obtain M image processing instructions from the neuron storage unit in the preset time window;

delete the image processing instructions with identical functionalities in the M image processing instructions to obtain N image processing instructions, in which the M is an integer greater than 1 and the N is an integer smaller than the M; and process the target area according to the N image processing instructions and the target image processing model to obtain the processed image.

Specifically, when the neuron storage unit 121 of the storage unit 120 stores the voice signal and the image to be processed, and the weight cache unit 122 stores the target voice instruction conversion model, the neural network operation subunit 1131 may be configured to convert the voice signal into text information through the voice recognition technology, convert the text information into the image processing instruction through the natural language processing technology and the target voice instruction conversion model, and divide the image to be processed into areas according to the granularity of semantic areas in the image processing instruction and the image recognition technology to obtain the target area; or the neural network operation subunit 1131 may be specifically configured to:

convert the voice signal into the image processing instruction through the voice recognition technology, the semantic understanding technology, and the target voice instruction conversion model; and divide the image to be processed into areas according to the granularity of semantic areas in the image processing instruction and the image recognition technology to obtain the target area.

Furthermore, the neural network operation subunit 1131 may be configured to store the image processing instruction and the target area to the neuron cache unit 121. The neural network operation subunit 1131 may be configured to:

obtain the target voice instruction conversion model from the weight cache unit 122;

obtain M image processing instructions and the target area from the neuron storage unit 121 in the preset time window;

delete the image processing instructions with identical functionalities in the M image processing instructions to obtain N image processing instructions; and process the target area according to the N image processing instructions and the target image processing model to obtain the processed image.

Alternatively, the storage unit may include a universal data cache unit, and the neural network operation unit of the image processing unit may include a universal operation subunit;

When the universal data cache unit may be configured to cache the voice signal and the image to processed, the universal operation subunit may be configured to convert the voice signal into the image processing instruction and the target area;

the universal operation subunit may be further configured to process the target area according to the image processing instruction to obtain the processed image; and the universal operation subunit may be further configured to store the processed image in the universal data storage unit.

Furthermore, the universal operation subunit may be specifically configured to:

convert the voice signal into text information through the voice recognition technology;

convert the text information into the image processing instruction through the natural language processing technology; and divide the image to be processed into areas according to the granularity of semantic areas in the image processing instruction and the image recognition technology, and obtain the target area.

Furthermore, the universal operation subunit may be specifically configured to:

convert the voice signal into the image processing instruction through the voice recognition technology, the semantic understanding technology; and divide the image to be processed into areas according to the granularity of semantic areas in the image processing instruction and the image recognition technology, and obtain the target area.

Furthermore, the universal data cache unit may be configured to store the target area and the image processing instruction.

The universal operation subunit may be specifically configured to:

obtain M image processing instructions from the universal data cache unit in the preset time window;

delete the image processing instructions with identical functionalities in the M image processing instructions to obtain N image processing instructions, in which the M is an integer greater than 1 and the N is an integer smaller than the M; and process the target area according to the N image processing instructions and the target image processing model to obtain the processed image.

Specifically, when the universal data cache unit 123 of the storage unit 120 stores the voice signal and the image to be processed, the universal operation subunit 1132 may be configured to convert the voice signal into the text information through the voice recognition technology, convert the text information into the image processing instruction through the natural language processing technology and the target voice instruction conversion model, and divide the image to be processed into areas according to the granularity of semantic areas in the image processing instruction and the image recognition technology to obtain the target area; or the universal operation subunit 1132 may be configured to convert the voice signal into the image processing instruction through the voice recognition technology and the semantic understanding technology, and divide the image to be processed into areas according to the granularity of semantic areas in the image processing instruction and the image recognition technology to obtain the target area.

Furthermore, the universal operation subunit 1132 may be configured to store the image processing instruction and the target area to the universal data cache unit 123.

The universal operation subunit 1132 may be configured to:

obtain the target area from the universal data cache unit;

obtain M image processing instructions from the universal data cache unit in the preset time window;

delete the image processing instructions with identical functionalities in the M image processing instructions to obtain N image processing instructions; and process the target area according to the N image processing instructions and the target image processing model to obtain the processed image.

Specifically, the preset time window may refer to the preset time period. After the neural network operation subunit 1131 obtains M image processing instructions from the neuron storage module 121 in the preset time period or the universal operation subunit 1132 obtains M image processing instructions from the universal data cache unit, the neural network operation subunit 1131 or the universal operation subunit 1132 compares every two of the M image processing instructions, deletes instructions with identical functionalities from the M image processing instructions to obtain N image processing instructions. The neural network operation subunit 1131 or the universal operation subunit 1132 processes the image to be processed according to the N processing instructions and the target image processing model.

Examples are given to illustrate the method of the neural network operation subunit 1131 or the universal operation subunit 1132 comparing every two of the M image processing instructions. When the image processing instruction A and the image processing instruction B are identical, the neural network operation subunit 1131 or the universal operation subunit 1132 deletes the one with bigger overhead in the image processing instruction A and the image processing instruction B; and when the image processing instruction A and the image processing instruction B are different, the neural network operation subunit 1131 or the universal operation subunit 1132 obtains the similarity coefficient between the image processing instruction A and the image processing instruction B. When the similarity coefficient is greater than the similarity threshold, it is determined that the image processing instruction A and the image processing instruction B have identical functionalities, and the neural network operation subunit 1131 or the universal operation subunit 是 32 deletes the one with bigger overhead in the image processing instruction A and the image processing instruction B; when the similarity coefficient is lower than the similarity threshold, the neural network operation subunit 1131 or the universal operation subunit 1132 determines that the image processing instruction A and B have different functionalities. The image processing instructions A and B refer to any two of the M processing instructions.

The input/output unit 130 may be further configured to output the processed image.

The image processing unit may be configured to process the image to be processed according to the voice signal, and output the processed image through the input/output unit.

Examples are given to illustrate the semantic areas hereinafter. If the image processing device determines the face area as the target area according to the voice signal, the semantic area refers to the face area in the image to be processed. The image processing device determines the face as the granularity to obtain the plurality of face areas in the image to be processed; when the background is determined as the target area, the image processing device divides the image to be processed into the background area and the non-background area; when the red-color area is determined as the target area, the image processing device divides the image to be processed into areas in different colors.

Specifically, the voice recognition technology used in the present disclosure may include but not limited to the artificial neural network (ANN), the Hidden Markov Model (HMM), and other models. The first voice recognition unit is capable of processing the voice signal according to the voice recognition technology; the natural language processing technology may include but not limited to the statistical machine learning, ANN, and other methods, and the semantic understanding unit is capable of extracting semantic information according to the natural language processing technology; the image recognition technology may include but not limited to the edge-detection-based algorithm, the threshold segmentation algorithm, the region growing and watershed algorithm, the grayscale integral projection curve analysis algorithm, the template matching algorithm, the deformable template algorithm, the Hough transform algorithm, the Snake operator algorithm, the elastic image matching technology based on Gabor wavelet transform, the active shape model, the active appearance model, and the like. The image recognition unit is capable of segmenting the image to be processed into different areas according to the image recognition technology.

Alternatively, before the input/output unit 130 receives the voice signal and the image to be processed, the neural network operation subunit 1131 may implement adaptive training on the voice instruction conversion model to obtain the target voice instruction conversion model.

The neural network operation subunit 1131 may implement adaptive training on the voice instruction conversion model offline or online.

Specifically, the adaptive training on the voice instruction conversion model being implemented offline refers to that the neural network operation subunit 1131 may implement adaptive training on the voice instruction conversion model on the basis of hardware of the neural network operation subunit 1131 to obtain the target voice instruction conversion model; the adaptive training on the voice instruction conversion model being implemented online refers to that one cloud server different from the neural network operation subunit 1131 may implement adaptive training on the voice instruction conversion model to obtain the target voice instruction conversion model. When the neural network operation subunit 1131 needs to use the target voice instruction conversion model, the neural network operation subunit 1131 obtains the target voice instruction conversion model from the cloud server.

Alternatively, the adaptive training implemented by the neural network operation subunit 1131 on the voice instruction conversion model is supervised or unsupervised.

Specifically, the adaptive training implemented on the voice instruction conversion model being supervised refers to that:

the neural network operation subunit 1131 converts the voice signal into the prediction instruction according to the voice instruction conversion model; then determines the correlation coefficients between the prediction instruction and the corresponding instruction set, in which the instruction set is the set of instructions obtained manually from the voice signals; and the neural network operation subunit 1131 optimizes the voice instruction conversion model according to the correlation coefficients between the prediction instruction and the corresponding instruction set to obtain the target voice instruction conversion model.

For example, the adaptive training implemented on a voice instruction conversion model being supervised may include: the neural network operation subunit 1131 receives a segment of voice signals containing relevant commands such as changing the color of the image, rotating the image, and the like. Each command corresponds to one instruction set. For the input voice signal used for adaptive training, the corresponding instruction set is known. The neural network operation subunit 1131 takes the voice signals as the input data of the voice instruction conversion model to obtain the output prediction instruction. The neural network operation subunit 1131 computes the correlation coefficients between the prediction instruction and the corresponding instruction set, adaptively updates the parameters (such as the weights, the biases, and the like) in the voice instruction conversion model to improve performance of the voice instruction conversion model, and then obtains the target voice instruction conversion model.

Specifically, both the input and the output of the image processing unit 110 are images. The image processing unit 110 may process the image to be processed by methods including but not limited to ANN and traditional computer vision-based methods, the processing including but not limited to: body shape (such as leg sliming and breast augmentation), face change, face beautification, object change (a dog for a cat, a zebra for a horse, an orange for an apple, etc.), background change (a forest for a field), de-occlusion (such as reconstructing an occluded eye on the face), style change (changing into a Van Gogh style in one second), pose change (such as standing for sitting, a frontal face for a profile), changing a non-oil painting to an oil painting, and changing a background color of an image and a background season of an object in the image.

Alternatively, before the neural network operation subunit 1131 receives the voice signal, the neural network operation subunit 1131 may implement adaptive training on the image processing model to obtain the target image processing model.

The neural network operation subunit 1131 may implement the adaptive training on the image processing model offline or online.

Specifically, the adaptive training on the image processing model being implemented offline refers to that the neural network operation subunit 1131 may implement adaptive training on the image processing model on the basis of hardware of the neural network operation subunit 1131 to obtain the target voice instruction conversion model; the adaptive training on the image processing model being implemented online refers to that the cloud server different from the neural network operation subunit 1131 may implement adaptive training on the image processing model to obtain the target image processing model. When the neural network operation subunit 1131 needs to use the target image processing model, the neural network operation subunit 1131 obtains the target image processing model from the cloud server.

Alternatively, the adaptive training implemented by the neural network operation subunit 1131 on the image processing model is supervised or unsupervised.

Specifically, the adaptive training implemented by the neural network operation subunit 1131 on the image processing model being supervised refers to that:

the neural network operation subunit 1131 converts the voice signal into the predicted image according to the image processing model; then determines correlation coefficients between the predicted image and the corresponding target image, in which the target is the image obtained by manually processing the image to be processed according to the voice signal; and the neural network operation subunit 1131 optimizes the image processing model according to the correlation coefficients between the predicted image and the corresponding target image to obtain the target image processing model.

For example, the adaptive training implemented on the image processing model being supervised may include: the neural network operation subunit 1131 obtains one segment of voice signals containing relevant commands such as changing the color of the image or rotating the image. Each command corresponds to one target image. For the input voice signal used for adaptive training, the corresponding target image is known. The neural network operation subunit 1131 takes the voice signals as the input data of the image processing model to obtain the output predicted image. The neural network operation subunit 1131 computes the correlation coefficients between the predicted image and the corresponding target image, adaptively updates the parameters (such as the weights, the biases, and the like.) in the image processing model to improve performance of the image processing model, and then obtains the target image processing model.

The image processing unit 110 of the image processing device may further include:

an instruction cache unit 111 configured to store the instruction to be performed, in which the instruction includes the neural network operation instruction and the universal operation instruction; and an instruction processing unit 112 configured to transmit the neural network operation instruction to the neural network operation subunit, and transmit the universal operation instruction to the universal operation subunit.

It should be noted that when the neural network operation subunit 1131 in the image processing unit 113 of the image processing device processes the image and may implement adaptive training on the image processing model and the voice instruction conversion model, the instruction processing unit 112 obtains the neural network operation instruction from the instruction cache unit 111 and transmits the neural network operation instruction to the neural network operation subunit 1131 to drive the neural network operation subunit 1131. When the universal operation subunit 1132 performs the image processing operation, the instruction processing unit 112 obtains the universal operation instruction from the instruction cache unit 111 and transmits the universal operation instruction to the universal operation unit 1132 to drive the universal operation unit 1132.

In the present example, the image processing device is presented in the form of units. The "Unit" may refer to the application-specific integrated circuit (ASIC), the processor and the memory executing one or more software or firmware programs, the integrated logic circuit, and/or other components that provide the described functionalities It may be seen that in the examples, the input/output unit inputs the voice signal and the image to be processed; the storage unit stores the voice signal and the image to be processed; the image processing unit converts the voice signal into the image processing instruction and the target area, in which the target area is the processing area of the image to be processed, processes the target area according to the image processing instruction to obtain the processed image and then stores the image to be processed into the storage unit; and the input/output unit outputs the processed image. Compared with existing image processing technology, the disclosure processes images through voice, which may save users' time spent in learning image processing software prior to image processing and improve user experience.

Figure 15:
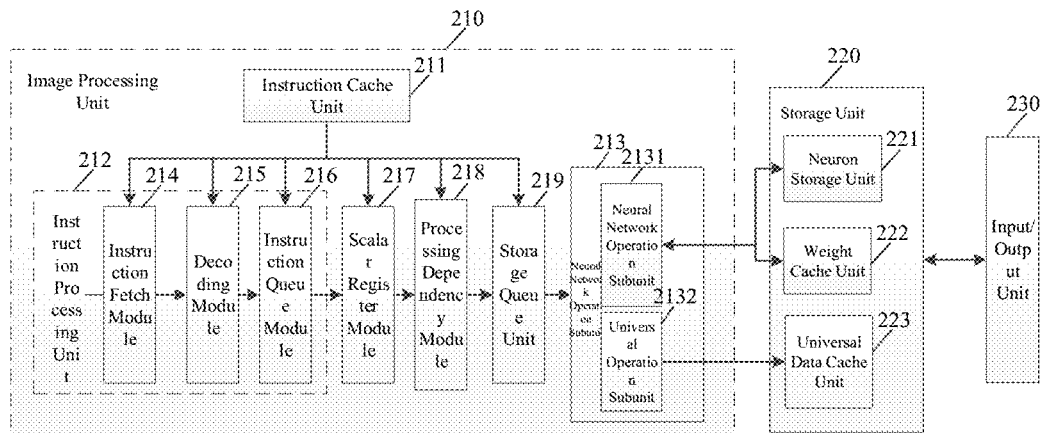
FIG. 15 is a partial structural diagram of another image processing device according to one example of the present disclosure.

Referring to FIG. 15, FIG. 15 is the partial structural diagram of another image processing device according to one example of the present disclosure. As shown in FIG. 15, the chip includes:

an image processing unit 210, a storage unit 220, and an input/output unit 230.

The image processing unit 210 includes:

an instruction cache unit 211 configured to store instructions to be performed, the instructions including the neural network operation instruction and the universal operation instruction, and in an example, the instruction cache unit 211 may be the reordered cache;

an instruction processing unit 212 configured to obtain the neural network operation instruction or the universal operation instruction from the instruction cache unit, process the instruction, and provide the instruction to the neural network operation unit 213. The instruction processing unit 212 may include:

an instruction fetch module 214 configured to obtain the instruction from the instruction cache unit;

a decoding module 215 configured to decode the obtained instruction;

an instruction queue module 216 configured for sequential storage of the decoded instruction;

a scalar register module 217 configured to store operation codes and operands corresponding to the instruction including neural network operation codes and operands corresponding to the neural network operation instruction, and universal operation codes and operands corresponding to the universal operation instruction.

The image processing unit 210 may further include:

a processing dependency module 218 configured to judge the instruction sent by the instruction processing unit 212, and the operation codes and operands corresponding to the instruction, and determine whether the instruction accesses the same data as the previous instruction. If the instruction accesses the same data as the previous instruction, store the instruction in a storage queue unit 219, and when the previous instruction is performed, provide the instruction in the storage queue unit to the neural network operation unit 219; otherwise, directly provide the instruction to the neural network operation unit 213.

The image processing unit 210 may further include:

the storage queue unit 219 configured to store and access two consecutive instructions in the same storage space when the instructions access the storage unit.

Specifically, in order to ensure the correctness of execution results of the two consecutive instructions, if the current instruction is detected to have the dependency on data of the previous instruction, the two consecutive instructions must wait in the storage queue unit 219 for the dependency to be eliminated before being provided to the neural network operation unit.

The image processing unit 210 may further include:

a neural network operation unit 213 configured to process instructions transmitted by the instruction processing unit or the storage queue unit.

The storage unit 220 may include a neuron cache unit 221 and a weight cache unit 222. A neural network data model is stored in the neuron cache unit 221 and the weight cache unit 222.

The input/output unit 230 may be configured to input the voice signal and output the image processing instruction.

In an example, the storage unit 220 may be the scratchpad memory and the input/output unit 230 may be the TO direct memory access module.

Specifically, the neural network operation subunit converting the voice signal into the image processing instruction may include:

in step A, fetching, by the instruction fetch module 214, the neural network operation instruction for voice recognition from the instruction cache unit 211, and sending the operation instruction to the decoding module 215;

in step B, decoding, by the decoding module 215, the operation instruction, and sending the decoded instruction to the instruction queue unit 216;

in step C, obtaining the neural network operation codes and the neural network operation operands corresponding to the instruction from the scalar register module 217;

in step D, sending the instruction to the processing dependency module 218; judging, by the processing dependency module 218, the operation codes and the operands corresponding to the instruction, and determining whether the instruction has the dependency on the previous instruction which has not been performed in terms of data; if the dependency does not exist, directly send the instruction to the neural network operation unit 213; if the dependency exists, the instruction needs to wait in the storage queue unit 219 until the dependency on the previous instruction which has not been performed in terms of data does not exist, and then sending the instruction to the neural network operation unit 213;

in step E, determining, by the neural network operation subunit 2131, the address and size of the required data according to the operation codes and the operands corresponding to the instruction, and extracting the required data from the storage unit 220 including voice instruction conversion model data and the like; and in step F, performing, by the neural network operation subunit 2131, the neural network operation corresponding to the instruction, completing corresponding processing, obtaining the image processing instruction, and writing the image processing instruction back to the neuron storage unit 221 of the storage unit 220.

Specifically, the universal operation subunit of the image processing device converting the voice signal into the image processing instruction may include:

in step A, fetching, by the instruction fetch module 214, the universal operation instruction for voice recognition from the instruction cache unit 211, and sending the operation instruction to the decoding module 215;

in step B, decoding, by the decoding module 215, the operation instruction, and sending the decoded instruction to the instruction queue unit 216;

in step C, obtaining the universal operation codes and the neural network operation operands corresponding to the instruction from the scalar register module 217;

in step D, sending the instruction to the processing dependency module 218; judging, by the processing dependency module 218, the operation codes and the operands corresponding to the instruction, and determining whether the instruction has the dependency on the previous instruction which has not been performed in terms of data; if the dependency does not exist, directly send the instruction to the neural network operation unit 213; if the dependency exists, the instruction needs to wait in the storage queue unit 219 until the dependency on the previous instruction which has not been performed in terms of data does not exist, and then sending the instruction to the neural network operation unit 213;

in step E, determining, by the universal operation subunit 2132, the address and size of required data according to the operation codes and the operands corresponding to the instruction, and extracting the required data from the storage unit 220 including the voice instruction conversion model data and the like; and in step F, performing, by the universal operation subunit 2132, the universal operation corresponding to the instruction, completing corresponding processing to obtain the image processing instruction, and writing the image processing instruction back to the universal data cache unit 223 of storage unit 220.

It should be noted that the specific image processing operations performed by the neural network operation subunit 2131 and the universal operation subunit 2132 of the neural network operation subunit 213, the neuron storage unit 221, the weight cache unit 222, and the universal data cache unit 223 of the storage unit 220, and the input/output subunit 230 will not be described here. For the details, refer to relevant description of the example shown in FIG. 14.

It should be noted that the storage unit 220 refers to the on-chip cache unit of the image processing device shown in FIG. 15.

Alternatively, the image processing device may be a data processing device, a robot, a computer, a tablet, an intelligent terminal, a mobile phone, a cloud server, a camera, a video camera, a projector, a watch, an earphone, a mobile storage, or a wearable device.

In an example, the image processing chip may include the main chip and the companion chip;

the companion chip may include the device described in the first aspect of the examples; and the main chip may be configured to provide the start signal for the companion chip, control and transmit the image to be processed and the image processing instruction to the companion chip.

Alternatively, the image processing chip can be applied to the camera, the mobile phone, the computer, the tablet, or other image processing devices.

In an example, examples provide the chip package structure, which may include the image processing chip.

In an example, examples provide the board card, which may include the chip package structure.

In an example, examples provide the electronic device, which may include the board card.

In an example, examples provide another electronic device, which may include the board card, the interactive interface, the control unit, and the voice collector.

Figure 16:
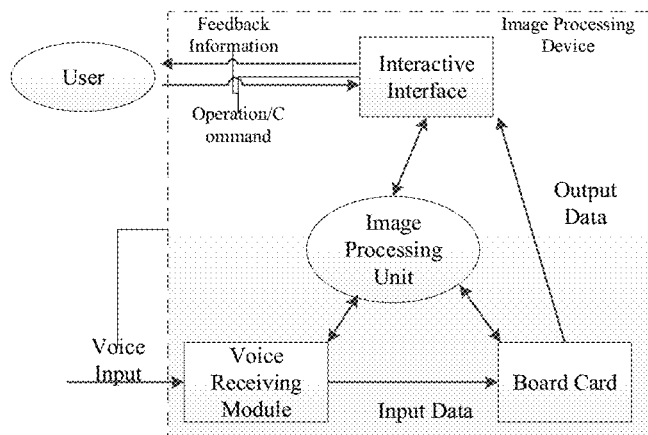
FIG. 16 is a structural diagram of an electronic device according to one example of the present disclosure.

As shown in FIG. 16, the voice collector may be configured to receive voice, and then transmit the voice and the image to be processed to the chip inside the board card as the input data.

Alternatively, the image processing chip may be the artificial neural network processing chip.

The voice collector may be the microphone or the multi-array microphone.

The chip inside the board card including the examples shown in FIG. 14 and FIG. 15 may be configured to obtain corresponding output data (the processed images) and transmit the corresponding output data to the interactive interface.

The interactive interface may be configured to receive the output data of the chip (which can be regarded as the artificial neural network processor) and convert the output data into one suitable form of feedback information to display to users.

The image processing unit may be configured to receive users' operations or commands and control the operation of the whole image processing device.

Alternatively, the electronic device may be a data processing device, a robot, a computer, a tablet, an intelligent terminal, a mobile phone, a cloud server, a camera, a video camera, a projector, a watch, an earphone, a mobile storage, or a wearable device.

Figure 17:
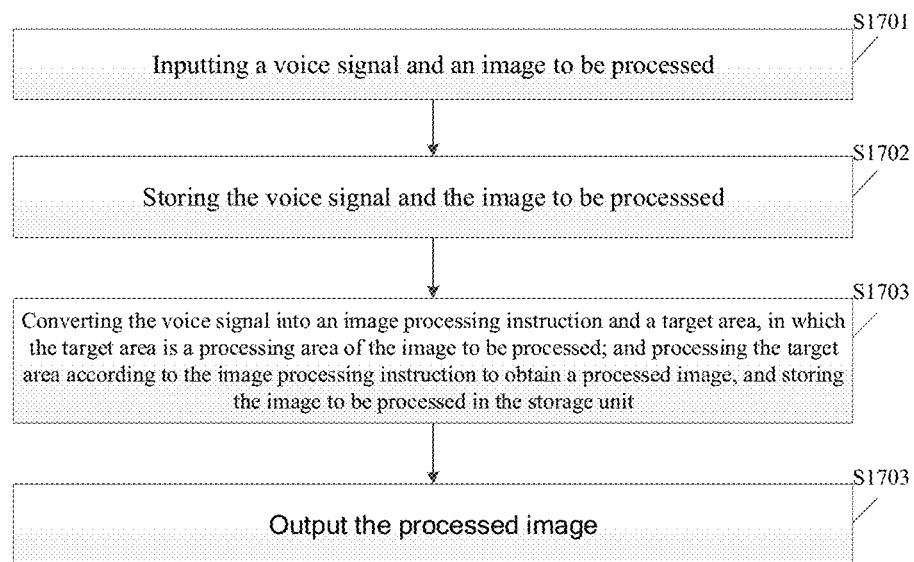
FIG. 17 is a flow chart of an image processing method according to one example of the present disclosure.

Referring to FIG. 17, FIG. 17 is the flow chart of the image processing method according to one example of the present disclosure. As shown in FIG. 17, the method includes:

in step 1701, receiving, by the image processing device, the voice signal and the image to be processed;

in step 1702, storing, by the image processing device, the voice signal and the image to be processed, and in step 1703, converting, by the image processing device, the voice signal into the image processing instruction and the target area according to the target voice instruction conversion model, in which the target area is the processing area of the image to be processed; processing the target area according to the image processing instruction to obtain the processed image; and storing the image to be processed in the storage unit.

In an example, the method of converting the voice signal into the image processing instruction and the target area may include:

converting the voice signal into the text information through the voice recognition technology;

converting the text information into the image processing instruction through the natural language processing technology and the target voice instruction conversion model; and dividing the image to be processed into areas according to granularity of semantic areas in the image processing instruction and image recognition technology, and obtaining the target area.

In an example, the method of converting the voice signal into the image processing instruction and the target area may include:

converting the voice signal into the text information through the voice recognition technology;

converting the text information into the image processing instruction through the natural language processing technology and the target voice instruction conversion model; and dividing the image to be processed into areas according to granularity of semantic areas in the image processing instruction and image recognition technology, and obtaining the target area.

In an example, the method of converting the voice signal into the image processing instruction and the target area a may include:

converting the voice signal into the image processing instruction through the voice recognition technology and the semantic understanding technology; and dividing the image to be processed into areas according to the granularity of semantic areas in the image processing instruction and the image recognition technology, and obtaining the target area.

In an example, after converting the voice signal into the image processing instruction and the target area, the method may further include: storing the image processing instruction and the target area.

In an example, the processing the target area according to the image processing instruction to obtain the processed image may include:

obtaining M image processing instructions from the neuron storage module in the preset time window;

deleting image processing instructions with identical functionalities in the M image processing instructions to obtain N image processing instructions, in which the M is an integer greater than 1 and the N is an integer smaller than the M; and processing the target area according to the N image processing instructions and the target image processing model to obtain the processed image.

In step 1704, the image processing device outputs the processed image.

In an example, the method may further include:

implementing adaptive training on the voice instruction conversion model to obtain the target voice instruction conversion model.

In an example, the adaptive training on the voice instruction conversion model is implemented either offline or offline.

In an example, the adaptive training implemented on the voice instruction conversion module is supervised or unsupervised.

In an example, the implementing adaptive training on the voice instruction conversion model to obtain the target voice instruction conversion model may include:

converting the voice signal into the prediction instruction according to the voice instruction conversion model;

determining the correlation coefficients between the prediction instruction and the corresponding instruction set; and optimizing the voice instruction conversion model according to the correlation coefficients between the prediction instruction and the corresponding instruction set to obtain the target voice instruction conversion model.

In an example, the method may further include:

implementing adaptive training on the image processing model to obtain the target image processing model.

In an example, the adaptive training on the image processing model is implemented either offline or offline.

In an example, the adaptive training implemented on the image processing model is supervised or unsupervised.

In an example, the implementing adaptive training on the image processing model may include:

processing the image to be processed according to the image processing model to obtain the predicted image;

determining the correlation coefficients between the prediction instruction and the corresponding target image; and optimizing the image processing model according to the correlation coefficients between the prediction instruction and the corresponding target image to obtain the target image processing model.

It should be noted that the implementation process of the above each step in the method shown in FIG. 17 will not be described here. For the details, refer to the specific implementation process of the image processing model.

It should be noted that, for the sake of simplicity, the foregoing method examples are described as a series of action combinations, however, those skilled in the art should be aware that the present disclosure is not limited by the order of actions described because according to the present disclosure, certain steps or may be performed in other order or simultaneously. Besides, those skilled in the art should also be aware that the examples described in the specification are alternative examples and that the actions and modules involved are not necessary in the present disclosure.

In the examples, the description of each example has different emphasis. For the parts not described in detail in one example, reference may be made to related descriptions in other examples.

In the examples of the disclosure, it should be understood that the device disclosed may be implemented in other manners. For example, the described device examples are merely illustrative; for instance, division of the unit is only a logical function division and can be divided in other manners during actual implementations, for example, a plurality of units or components may be combined or integrated into another system, or some features may be ignored, or not performed. In addition, coupling or direct coupling or communication connection between each illustrated or discussed component may be indirect coupling or communication connection through some interfaces, devices or units, and may be electrical connection or other forms of connection.

The units described as separate components may or may not be physically separated and the components illustrated as units may or may not be physical units, that is, the units or the components may be in the same place or may be distributed to a plurality of network units. All or part of the units may be selected according to actual needs to achieve the purpose of the technical solutions of the examples.

In addition, functional units in various examples may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, a network device, and the like) to perform all or part of the steps described in the various examples. The memory includes various medium capable of storing program codes, such as a USB (universal serial bus) flash disk, a read-only memory (ROM), a random access memory (RAM), a removable hard disk, Disk, compact disc (CD), or the like.

The examples are described in detail above and specific examples are used herein to describe the principle and implementation manners of the present disclosure. The description of the above examples is merely used to help understand the method and the core idea of the present disclosure. Meanwhile, those skilled in the art may make modifications to the specific implementation manners and the application scope according to the idea of the present disclosure. In summary, the contents of the specification should not be regarded as limiting the present disclosure.

What is claimed is:

1. An image processing device, comprising:
    a receiving circuit configured to receive a voice signal and an image to be processed;
    a conversion circuit configured to convert the voice signal into an image processing instruction and obtain a target area according to a target voice instruction conversion model, wherein the target area is a processing area of the image to be processed; and
    a processing circuit configured to:
        obtain M image processing instructions from a storage device in a preset time window, wherein M is an integer greater than 1;
        delete image processing instructions with identical functionalities in the M image processing instructions to obtain N image processing instructions, wherein N is an integer smaller than M; and
        process the target area according to the image processing instruction converted from the voice signal, the N image processing instructions obtained from the storage device and a target image processing model.

2. The image processing device of claim 1, wherein the conversion circuit is configured to:
    convert the voice signal into text information through a voice recognition technology, convert the text information into the image processing instruction through a natural language processing technology and the target voice instruction conversion model, and divide the image to be processed into areas according to granularity of semantic areas in the image processing instruction and an image recognition technology, and obtain the target area.

3. The image processing device of claim 1, wherein the conversion circuit is further configured to:

convert the voice signal into the image processing instruction through the voice recognition technology, a semantic understanding technology, and the target voice instruction conversion model, and divide the image to be processed into areas according to the granularity of semantic areas in the image processing instruction and the image recognition technology, and obtain the target area.

4. The image processing device of claim 1, wherein the image processing device further includes:

the storage device configured to store the text information, the image processing instruction, or the target area.

5. The image processing device of claim 1, wherein the conversion circuit is configured to:

implement adaptive training on a voice instruction conversion model to obtain the target voice instruction conversion model.

6. The image processing device of claim 1, wherein the image processing device further includes:

a training circuit configured to convert the voice signal into the prediction instruction according to the voice instruction conversion model, determine the correlation coefficients between the prediction instruction and the corresponding instruction set, and optimize the voice instruction conversion model according to the correlation coefficients between the prediction instruction and the corresponding instruction set to obtain the target voice instruction conversion model.

7. The image processing device of claim 1, wherein the image processing device is configured to:

implement adaptive training on the image processing model to obtain the target image processing model.

8. The image processing device of claim 7, wherein the image processing device is further configured to:

process the image to be processed according to the image processing model to obtain the predicted image;

determine correlation coefficients between the predicted image and the corresponding target image; and optimize the image processing model according to the correlation coefficients between the predicted image and the corresponding target image to obtain the target image processing model.

9. An image processing method including:

receiving a voice signal and an image to be processed, converting a voice signal into an image processing instruction and to obtain a target area according to a target voice instruction conversion model, wherein the target area is a processing area of the image to be processed, obtain M image processing instructions from a storage device in a preset time window, wherein M is an integer greater than 1, delete image processing instructions with identical functionalities in the M image processing instructions to obtain N image processing instructions, wherein N is an integer smaller than M, and processing the target area according to the image processing instruction converted from the voice signal, the N image processing instructions obtained from the storage device, and the target image processing model.

10. The method of claim 9, wherein the converting of the voice signal into the image processing instruction and the obtaining of the target area according to the target voice instruction conversion model includes:

converting the voice signal into text information through a voice recognition technology, converting the text information into the image processing instruction through a natural language processing technology and the target voice instruction conversion model, and dividing the image to be processed into areas according to granularity of semantic areas in the image processing instruction and an image recognition technology and obtaining the target area.

11. The method of claim 9, wherein the converting of the voice signal into the image processing instruction and the target area according to the target voice instruction conversion model includes:

converting the voice signal into the image processing instruction through the voice recognition technology, a semantic understanding technology, and the target voice instruction conversion model, and dividing the image to be processed into areas according to the granularity of semantic areas in the image processing instruction and the image recognition technology and obtaining the target area.

12. The method of claim 9, wherein the method further includes:

storing the text information, the image processing instruction, or the target area.

13. The method of claim 9, wherein prior to the receiving of the voice signal and the image to be processed, the method further includes:

implementing an adaptive training on the voice instruction conversion model to obtain the target voice instruction conversion model.

14. The method of claim 13, wherein the implementing of the adaptive training on the voice instruction conversion model to obtain the target voice instruction conversion model includes:

converting the voice signal into the prediction instruction according to the voice instruction conversion model;

determining the correlation coefficients between the prediction instruction and the corresponding instruction set; and optimizing the voice instruction conversion model according to the correlation coefficients between the prediction instruction and the corresponding instruction set to obtain the target voice instruction conversion model.

15. The method of claim 9, wherein prior to the receiving of the voice signal and the image to be processed, the method further includes:

implementing the adaptive training on the image processing model to obtain the target image processing model.

16. The method of claim 15, wherein the implementing of the adaptive training on the image processing model to obtain the target image processing model includes:

processing the image to be processed according to the image processing model to obtain the predicted image;

determining the correlation coefficients between the predicted image and the corresponding target image; and optimizing the image processing model according to the correlation coefficients between the predicted image and the corresponding target image to obtain the target image processing model.

* * * * *